(12) United States Patent
Kim et al.

(10) Patent No.: US 11,838,786 B2
(45) Date of Patent: *Dec. 5, 2023

(54) COMMUNICATION METHOD AND APPARATUS IN WIRELESS COMMUNICATION SYSTEM

(71) Applicant: Samsung Electronics Co., Ltd., Gyeonggi-do (KR)

(72) Inventors: Soenghun Kim, Gyeonggi-do (KR); Sangbum Kim, Gyeonggi-do (KR); Jaehyuk Jang, Gyeonggi-do (KR); Gert Jan Van Lieshout, Apeldoorn (NL)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 18/103,110

(22) Filed: Jan. 30, 2023

(65) Prior Publication Data
US 2023/0180043 A1 Jun. 8, 2023

Related U.S. Application Data

(63) Continuation of application No. 17/410,484, filed on Aug. 24, 2021, now Pat. No. 11,570,650, which is a
(Continued)

(51) Int. Cl.
*H04W 24/10* (2009.01)
*H04L 1/1867* (2023.01)
(Continued)

(52) U.S. Cl.
CPC ........... *H04W 24/10* (2013.01); *H04L 1/1887* (2013.01); *H04W 4/029* (2018.02);
(Continued)

(58) Field of Classification Search
CPC . H04W 24/10; H04W 4/029; H04W 72/1268; H04W 72/21; H04W 76/10;
(Continued)

(56) References Cited

U.S. PATENT DOCUMENTS

2010/0085926 A1 4/2010 Harada
2010/0316031 A1 12/2010 Sasao et al.
(Continued)

FOREIGN PATENT DOCUMENTS

CN 103503328 1/2014
CN 103597892 2/2014
(Continued)

OTHER PUBLICATIONS

Korean Office Action dated Feb. 20, 2023 issued in counterpart application No. 10-2018-7000376, 9 pages.
(Continued)

*Primary Examiner* — Ashley Shivers
(74) *Attorney, Agent, or Firm* — The Farrell Law Firm, P.C.

(57) ABSTRACT

Methods and devices in a wireless communication system are provided. A method includes receiving, from a base station, a radio resource control (RRC) reconfiguration message configuring a medium access control (MAC) parameter for the terminal; identifying an uplink grant for a MAC protocol data unit (PDU); identifying that skip uplink transmission information indicating for the terminal to skip an uplink transmission is configured in the RRC reconfiguration message and that the uplink grant is addressed to a cell-radio network temporary identifier (C-RNTI) or is a configured uplink grant; and skipping a generation of the MAC PDU for the uplink grant, in case that a MAC service
(Continued)

data unit (SDU) for the MAC PDU does not exist, and the MAC PDU includes only a padding buffer status report (BSR).

16 Claims, 25 Drawing Sheets

Related U.S. Application Data continuation of application No. 16/588,382, filed on Sep. 30, 2019, now Pat. No. 11,109,254, which is a continuation of application No. 15/744,677, filed as application No. PCT/KR2016/007759 on Jul. 15, 2016, now Pat. No. 10,582,403.

(60) Provisional application No. 62/316,056, filed on Mar. 31, 2016, provisional application No. 62/197,383, filed on Jul. 27, 2015, provisional application No. 62/194,632, filed on Jul. 20, 2015.

(51) Int. Cl.
  *H04W 72/1268* (2023.01)
  *H04W 76/10* (2018.01)
  *H04W 84/12* (2009.01)
  *H04W 88/06* (2009.01)
  *H04W 88/08* (2009.01)
  *H04W 72/21* (2023.01)
  *H04W 4/029* (2018.01)
  *H04W 72/23* (2023.01)

(52) U.S. Cl.
  CPC ....... *H04W 72/1268* (2013.01); *H04W 72/21* (2023.01); *H04W 76/10* (2018.02); *H04W 84/12* (2013.01); *H04W 88/06* (2013.01); *H04W 88/08* (2013.01); *H04W 72/23* (2023.01)

(58) Field of Classification Search
  CPC ..... H04W 84/12; H04W 88/06; H04W 88/08; H04W 72/23; H04W 84/042; H04L 1/1887
  See application file for complete search history.

(56) References Cited

U.S. PATENT DOCUMENTS

| | | |
|---|---|---|
| 2012/0178448 A1 | 7/2012 | Yuk et al. |
| 2012/0307648 A1 | 12/2012 | Okubo et al. |
| 2013/0242783 A1 | 9/2013 | Horn et al. |
| 2014/0010223 A1 | 1/2014 | Wang |
| 2014/0010321 A1 | 1/2014 | Kang et al. |
| 2014/0045497 A1 | 2/2014 | Abe et al. |
| 2014/0146907 A1 | 5/2014 | Kim et al. |
| 2014/0199994 A1 | 7/2014 | Richards |
| 2014/0247743 A1 | 9/2014 | Seo |
| 2014/0295840 A1 | 10/2014 | Keskitalo |
| 2014/0301297 A1 | 10/2014 | Geirhofer et al. |
| 2014/0369308 A1 | 12/2014 | Gerstenberger et al. |
| 2015/0031367 A1 | 1/2015 | Singh et al. |
| 2015/0296447 A1 | 10/2015 | Luo et al. |
| 2015/0318907 A1 | 11/2015 | Zhang et al. |
| 2015/0351024 A1 | 12/2015 | Jang et al. |
| 2016/0050605 A1 | 2/2016 | Kim et al. |
| 2016/0100378 A1 | 4/2016 | Chang et al. |
| 2016/0192283 A1 | 6/2016 | Kwak et al. |
| 2016/0373235 A1 | 12/2016 | Oh et al. |
| 2017/0127306 A1 | 5/2017 | Tan Bergstrom et al. |
| 2018/0124774 A1 | 5/2018 | Takahashi et al. |

FOREIGN PATENT DOCUMENTS

| | | |
|---|---|---|
| CN | 104303542 | 1/2015 |
| CN | 107615795 | 1/2018 |
| JP | 2010-288131 | 12/2010 |
| JP | 2015-517241 | 6/2015 |
| KR | 1020140146092 | 12/2014 |
| WO | WO 2013/131264 | 9/2013 |
| WO | WO 2013/138046 | 9/2013 |
| WO | WO 2014/110807 | 7/2014 |
| WO | WO 2014/111772 | 7/2014 |
| WO | WO 2014/157898 | 10/2014 |
| WO | WO 2015/013068 | 1/2015 |
| WO | WO 2015/016688 | 2/2015 |
| WO | WO 2015/037940 | 3/2015 |

OTHER PUBLICATIONS

PCT/ISA/210 Search Report issued on PCT/KR2016/007759 (pp. 3).
PCT/ISA/237 Written Opinion issued on PCT/KR2016/007759 (pp. 4).
European Search Report dated Jun. 7, 2018 issued in counterpart application No. 16828011.3-1215, 8 pages.
U.S. Office Action dated Jul. 31, 2018 issued in counterpart U.S. Appl. No. 15/744,656, 10 pages.
Qualcomm Incorporated et al., "Correction of UL SPS Test Case 7.1.4.2", R5-151744, 3GPP TSG RAN WG5 Meeting #67, May 25-29, 2015, 14 pages.
3GPP, "Layer 2", 3GPP TS 36.523-1 V12.5.0, XP050960180, Release 12, Mar. 26, 2015, 386 pages.
European Search Report dated Jun. 4, 2020 issued in counterpart application No. 20173501.6-1215, 12 pages.
Japanese Office Action dated Jun. 22, 2020 issued in counterpart application No. 2017-564899, 6 pages.
Chinese Office Action dated Jul. 3, 2020 issued in counterpart application No. 201680043923.2, 24 pages.
Samsung, "Overall Operational Procedure for LTE-WLAN Interworking", R2-152248, 3GPP TSG-RAN WG2 Meeting #90, May 25-29, 2015, 4 pages.
Chinese Office Action dated Dec. 8, 2020 issued in counterpart application No. 201680042621.3, 14 pages.
Nokia Siemens Networks, "Padding BSR and Empty Transmission Buffers", R2-105318, 3GPP TSG-RAN WG2 Meeting #71bis, Oct. 11-15, 2010, 3 pages.
Samsung, "Signaling Aspects of Existing LTE-A Parameters", R2-110631, 3GPP TSG-RAN2 Meeting #72bis, Jan. 17-21, 2011, 5 pages.
Japanese Office Action dated Apr. 18, 2022 issued in counterpart application No. 2021-060683, 7 pages.
Korean Office Action dated Nov. 10, 2022 issued in counterpart application No. 10-2018-7002423, 6 pages.
3GPP TS 36.523-1 V12.6.0, "Layer 2", Protocol Conformance Specification (Release 12), Jun. 2015, 429 pages.
Samsung, "Skipping Uplink Transmission with no Data to Transmit", R2-153333, 3GPP TS-RAN WG2 Meeting #91, Aug. 24-28, 2015, 3 pages.
Samsung, "Skipping Uplink Transmission with no Data to Transmit", R2-153332, 3GPP TSG-RAN WG2 Meeting #91, Aug. 24-28, 2015, 2 pages.
Samsung, "Skipping Uplink Transmission with no Data to Transmit", R2-153334, 3GPP TSG-RAN WG2 Meeting #91, Aug. 24-28, 2015, 6 pages.
Korean Office Action dated Jun. 26, 2023 issued in counterpart application No. 10-2023-7013234, 9 pages.

FIG. 20

| $C_7$ | $C_6$ | $C_5$ | $C_4$ | $C_3$ | $C_2$ | $C_1$ | R | Oct 1 |
|---|---|---|---|---|---|---|---|---|
| $C_{15}$ | $C_{14}$ | $C_{13}$ | $C_{12}$ | $C_{11}$ | $C_{10}$ | $C_9$ | $C_8$ | Oct 2 |
| $C_{23}$ | $C_{22}$ | $C_{21}$ | $C_{20}$ | $C_{19}$ | $C_{18}$ | $C_{17}$ | $C_{16}$ | Oct 3 |
| $C_{31}$ | $C_{30}$ | $C_{29}$ | $C_{28}$ | $C_{27}$ | $C_{26}$ | $C_{25}$ | $C_{24}$ | Oct 4 |

(a)

| $C_8$ | $C_7$ | $C_6$ | $C_5$ | $C_4$ | $C_3$ | $C_2$ | $C_1$ | Oct 1 |
|---|---|---|---|---|---|---|---|---|
| $C_{16}$ | $C_{15}$ | $C_{14}$ | $C_{13}$ | $C_{12}$ | $C_{11}$ | $C_{10}$ | $C_9$ | Oct 2 |
| $C_{24}$ | $C_{23}$ | $C_{22}$ | $C_{21}$ | $C_{20}$ | $C_{19}$ | $C_{18}$ | $C_{17}$ | Oct 3 |
| R | $C_{31}$ | $C_{30}$ | $C_{29}$ | $C_{28}$ | $C_{27}$ | $C_{26}$ | $C_{25}$ | Oct 4 |

(b)

| 1 | 1 | 1 | 1 | 1 | 1 | 1 | 1 | 1 | 1 | 1 |

FIG. 25A

| 0 | 0 | 0 | 0 | 0 | 1 | 0 | 0 | 0 | 0 | 1 |

FIG. 25B

| 1 | 1 | 1 | 1 |

FIG. 25C

COMMUNICATION METHOD AND APPARATUS IN WIRELESS COMMUNICATION SYSTEM

PRIORITY

This application is a Continuation Application of U.S. application Ser. No. 17/410,484, filed in the U.S. Patent and Trademark Office (USPTO) on Aug. 24, 2021, now U.S. Pat. No. 11,570,650, issued on Jan. 31, 2023, which is a Continuation Application of U.S. application Ser. No. 16/588,382, filed in the USPTO on Sep. 30, 2019, now U.S. Pat. No. 11,109,254, issued on Aug. 31, 2021, which is a Continuation of U.S. application Ser. No. 15/744,677, which was filed in the USPTO on Jan. 12, 2018, now U.S. Pat. No. 10,582,403, issued on Mar. 3, 2020, which is a National Phase Entry of PCT International Application No. PCT/KR2016/007759, which was filed on Jul. 15, 2016, and claims priority to U.S. Provisional Application Nos. 62/194,632, 62/197,383, and 62/316,056, which were filed in the USPTO on Jul. 20, 2015, Jul. 27, 2015, and Mar. 31, 2016, respectively, the content of each of which is incorporated herein by reference.

BACKGROUND

1. Field

The present invention relates to a method and apparatus for wireless communication in a wireless communication system.

2. Art

Wireless communication systems that were providing voice-based services have evolved to broadband wireless communication systems that are capable of providing packet data services based on high quality and high speed, such as: Long Term Evolution (LTE) or Evolved Universal Terrestrial Radio Access (E-UTRA), LTE-Advanced (LTE-A) or EUTRA Evolution, High Speed Packet Access (HSPA) defined in 3GPP; Ultra Mobile Broadband (UMB), High Rate Packet Data (HRPD) defined 3GPP2; the communication standard IEEE 802.16e; etc. LTE-A refers to systems evolved from LTE. LTE-A further includes functions such as Carrier Aggregation (CA), Higher order Multiple Input Multiple Output (Higher order MIMO), etc. in addition to functions of LTE. In the following description, the terms LTE and LTE-A will be used in the same sense as long as they are not specifically indicated.

The LTE and LTE-A systems, as typical examples of the broadband wireless communication systems, employ Orthogonal Frequency Division Multiplexing (OFDM) in the downlink and Single Carrier-Frequency Division Multiple Access (SC-FDMA) in the uplink. The Multiple Access performs allocation and management of time-frequency resources to carry data and control information according to users, so as not to overlap each other, i.e., so as to achieve orthogonality between them, thereby distinguishing data or control information between respective users.

In order to meet the increase in the demand for wireless data traffic after the commercialization of 4G communication systems, considerable effort has been made to develop pre-5G communication systems or improved 5G communication systems. This is one reason why '5G communication systems' or 'pre-5G communication systems' are called 'beyond 4G network communication systems' or 'post LTE systems.' In order to achieve a high data transmission rate, 5G communication systems are being developed to be implemented in a band of extremely high frequency, or millimeter wave (mmWave), e.g., a band of 60 GHz. In order to reduce the occurrence of stray electric waves in a band of extremely high frequency energy and to increase the transmission distance of electric waves in 5G communication systems, various technologies being explored, for example: beamforming, massive MIMO, Full Dimensional MIMO (FD-MIMO), array antennas, analog beam-forming, large scale antennas, etc. In order to improve system networks for 5G communication systems, various technologies have been developed, e.g., evolved small cell, advanced small cell, cloud radio access network (cloud RAN), ultra-dense network, Device to Device communication (D2D), wireless backhaul, moving network, cooperative communication, Coordinated Multi-Points (CoMP), interference cancellation, etc. In addition, for 5G communication systems, other technologies have been developed, e.g., Hybrid FSK and QAM Modulation (FQAM) and Sliding Window Superposition Coding (SWSC), as Advanced Coding Modulation (ACM), Filter Bank Multi Carrier (FBMC), non-orthogonal multiple access (NOMA), sparse code multiple access (SCMA), etc.

The Internet has evolved from a human-based connection network, where humans create and consume information to the Internet of Things (IoT) where distributed configurations, such as objects, exchange information with each other to process the information. The technology related to the IoT is starting to be combined with, for example, a technology for processing big data through connection with a cloud server, and this is called an Internet of Everything (IoE) technology. In order to manifest the IoT, various technical components are required, such as, a sensing technology, wired/wireless communication and network infra technology, a service interfacing technology, a security technology, etc. In recent years, a sensor network for connecting objects, Machine to Machine (M2M), Machine Type Communication (MTC), etc. have been researched. Under the IoT environment, intelligent Internet Technology (IT) services may be provided to collect and analyze data obtained from objects connected to each other and thus to create new value for human life. As existing information technologies are fused and combined with various industries, the IoT may also be applied within various fields, such as: smart homes, smart buildings, smart cities, smart cars or connected cars, smart grids, health care, smart home appliances, high quality medical services, etc.

Various attempts have been made to apply 5G communication systems to the IoT network. For example, various technologies related to sensor networks, Machine to Machine (M2M), Machine Type Communication (MTC), etc., have been implemented by beam-forming, MIMO, array antenna, etc., as 5G communication technology. The application of the cloud RAN as a big data processing technology described above may be an example of a hybrid of 5G technology and IoT technology. Wireless communication systems have evolved in software or hardware to provide higher quality communication. For example, a communication technology has been developed to employ a number of antennas. A technology for efficiently restoring data from physical signals has made progress.

In order to meet the increasing demand in large communication capacity, a number of technologies have been proposed, e.g., a method of providing a number of connections. In Long Term Evolution (LTE) systems, a carrier aggregation (CA) technique provides a number of connections using a number of carriers, so that users can receive various services via a number of resources.

The present invention has been made to address the above problems and disadvantages, and to provide at least the advantages described below. Various embodiments of the present invention provide a method and apparatus for providing dual connectivity using radio access technologies (RATs) that differ from each other in a wireless communication system.

SUMMARY

In accordance with an aspect of the present invention, a method performed by a terminal in a wireless communication system is provided. The method includes method performed by a terminal in a wireless communication system, the method comprising: receiving, from a base station, a radio resource control (RRC) reconfiguration message configuring a medium access control (MAC) parameter for the terminal; identifying an uplink grant for a MAC protocol data unit (PDU); identifying that skip uplink transmission information indicating for the terminal to skip an uplink transmission is configured in the RRC reconfiguration message and that the uplink grant is addressed to a cell-radio network temporary identifier (C-RNTI) or is a configured uplink grant; and skipping a generation of the MAC PDU for the uplink grant, in case that a MAC service data unit (SDU) for the MAC PDU does not exist, and the MAC PDU includes only a padding buffer status report (BSR).

In accordance with another aspect of the present invention, a method performed by base station in a wireless communication system is provided. The method includes transmitting, to a terminal, an RRC reconfiguration message configuring a MAC parameter for the terminal; and allocating an uplink grant for a MAC PDU. A generation of the MAC PDU is skipped for the uplink grant, in case that: skip uplink transmission information indicating for the terminal to skip an uplink transmission is configured in the RRC reconfiguration message and the uplink grant is addressed to a C-RNTI or is a configured uplink grant, and a MAC SDU for the MAC PDU does not exist, and the MAC PDU includes only a padding BSR.

In accordance with another aspect of the present invention, a terminal in a wireless communication system is provided. The terminal includes a transceiver; and a controller configured to receive, from a base station, an RRC reconfiguration message configuring a MAC parameter for the terminal, identify an uplink grant for a MAC PDU, identify that skip uplink transmission information indicating for the terminal to skip an uplink transmission is configured in the RRC reconfiguration message and that the uplink grant is addressed to a C-RNTI or is a configured uplink grant, and skip a generation of the MAC PDU for the uplink grant, in case that a MAC SDU for the MAC PDU does not exist, and the MAC PDU includes only a padding BSR.

In accordance with another aspect of the present invention, a base station in a wireless communication system is provided. The base station includes a transceiver; and a controller configured to transmit, to a terminal, an RRC reconfiguration message configuring a MAC parameter for the terminal, and allocate an uplink grant for a MAC PDU. A generation of the MAC PDU is skipped for the uplink grant, in case that: skip uplink transmission information indicating for the terminal to skip an uplink transmission is configured in the RRC reconfiguration message and the uplink grant is addressed to a C-RNTI or is a configured uplink grant, and a MAC SDU for the MAC PDU does not exist, and the MAC PDU includes only a padding buffer BSR.

BRIEF DESCRIPTION OF THE DRAWINGS

The above and other aspects, features and advantages of the invention will be more apparent from the following detailed description, taken in conjunction with the accompanying drawings, in which:

FIG. 20 is a diagram illustrating an extended A/D MAC CE for supporting up to 32 serving cells;

FIGS. 25A, 25B, and 25C illustrate example bit maps according to the present invention.

DETAILED DESCRIPTION

Figure 1:
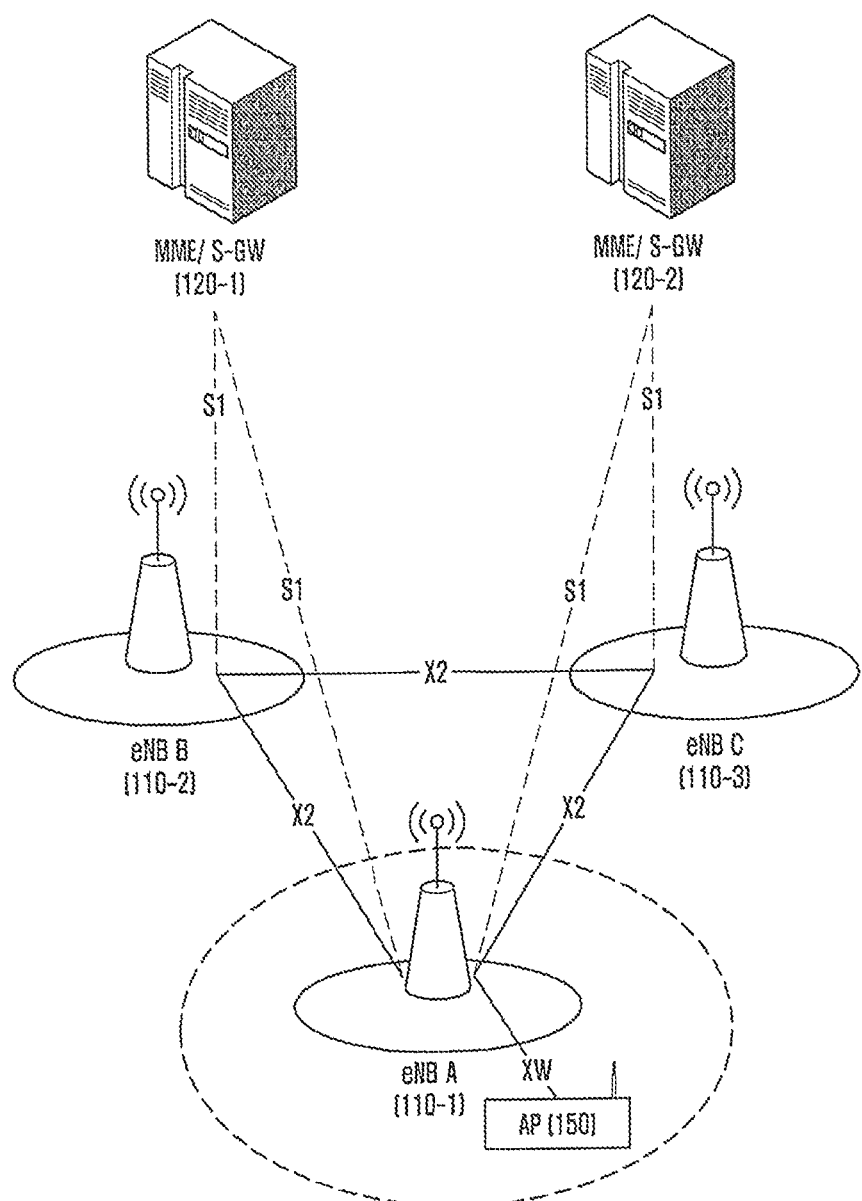
FIG. 1 is a diagram showing the network configuration of a wireless communication system according to Embodiment 1 of the present invention.

Hereinafter, embodiments of the present invention are described in detail with reference to the accompanying drawings. The same reference numbers are used throughout the drawings to refer to the same or similar parts. Detailed descriptions of well-known functions and structures incorporated herein may be omitted to avoid obscuring the subject matter of the invention.

In the following description, part of the embodiments of the present invention will be described based on Advanced E-UTRA (also called LTE-A) supporting carrier aggregation; however, it will be appreciated to those skilled in the art that the subject matter of the present invention can also be applied to various types of communication systems which have the technical background and channel forms similar to those of the present invention, without departing from the scope and sprit of the present invention. For example, the subject matter of the present invention may be applied to multicarrier HSPA supporting carrier aggregation.

In the following description, certain detailed explanations of related art are omitted when it is deemed that they may unnecessarily obscure the essence of the invention.

Although the drawings represent embodiments of the present invention, they are not necessarily to scale and certain features may be exaggerated or omitted in order to better illustrate and explain the present invention. The same reference numbers are used throughout the drawings to refer to the same or similar parts.

The features and advantages of the present invention and the method to achieve them will become more apparent from the following detailed description in conjunction with the accompanying drawings. It will be easily appreciated to those skilled in the art that various modifications, additions and substitutions are possible from the embodiments of the invention that are illustrated and described in detail in the following description, and the scope of the invention should not be limited to the following embodiments. The embodiments of the present invention are provided such that those skilled in the art completely understand the invention. It should be understood that the invention may include all modifications and/or equivalents and/or substations included in the idea and technical scope of the present disclosure. In the drawings, the same or similar elements are denoted by the same reference numbers even though they are depicted in different drawings.

In addition, it should be understood that the processes, operations of the flow diagrams and a combination thereof can be performed via computer programming instructions. These computer programming instructions can be installed to processors of data processing equipment that can be programmed, special computers, or universal computers. The instructions, performed via the processors of data processing equipment or the computers, can generate means that perform functions described in blocks of the flow diagram. In order to implement functions in a particular mode, the computer programming instructions can also be stored in a computer available memory or computer readable memory that can support computers or data processing equipment that can be programmed. Therefore, the instructions, stored in the computer available memory or computer readable memory, can be installed to the products, and perform the functions therein, described in the blocks of the flow diagram therein. In addition, since the computer programming instructions can also be installed to computers or data processing equipment that can be programmed, they can create processes that perform a series of operations therein, described in the blocks of the flow diagram therein.

The blocks of the flow diagram refer to part of codes, segments or modules that include one or more executable instructions to perform one or more logic functions. It should be noted that the functions described in the blocks of the flow diagram may be performed in a different order from the embodiments described above. For example, the functions described in two adjacent blocks may be performed at the same time or in reverse order.

In the embodiments, the terminology '~unit' representing a component refers to a software element or a hardware element such as a PGGA, an ASIC, etc., and performs a corresponding function. It should be, however, understood that the component '~unit' is not limited to a software or hardware element. The component '~unit' may be implemented in storage media that can be designated by addresses. The component '~unit' may also be configured to regenerate one or more processors. For example, the component '~unit' may include various types of elements (e.g., software elements, object-oriented software elements, class elements, task elements, etc.), segments (e.g., processes, functions, achieves, attribute, procedures, sub-routines, program codes, etc.), drivers, firmware, micro-codes, circuit, data, data base, data structures, tables, arrays, variables, etc. Functions provided by elements and the components '~units' may be formed by combining the small number of elements and components '~units' or may be divided into additional elements and components '~units.' In addition, elements and components '~units' may also be implemented to regenerate one or more CPUs in devices or security multi-cards.

Embodiment 1

Embodiment 1 relates to a technology for providing dual connectivity to a wireless communication system.

In the following description, terms used to identify an access node, terms referred to as network entities, terms expressing messages, terms representing interfaces between network objects, terms used for various types of identification information, etc. are used for the sake of convenient description. Therefore, the present invention is not limited by the terms and may use other terms with the meanings equivalent to the terms described in the present disclosure, representing the corresponding components.

For the sake of convenient description, the present disclosure uses terms and names defined in the specifications of the 3rd Generation Partnership Project Long Term Evolution (3GPP LTE) and Institute of Electrical and Electronic Engineers (IEEE) 802.11. However, it should be understood that the present invention is not limited to the terms and names and may also be applied to systems following the other standards.

The following description explains embodiments of the present invention that provide the dual connectivity using a wireless local area network (WLAN) technology in cellular communication systems. However, it should be understood that the present invention may also be applied to a radio access technology (RAT).

FIG. 1 is a diagram showing the network configuration of a wireless communication system according to an embodiment of the present invention.

With reference to FIG. 1, the wireless communication system includes eNB A (110-1), eNB B(110-2), eNB C(110-3), mobility management entities (MMEs)/serving-gateways (S-GWs) 120-1 and 120-2, and access point (AP) 150. Although the embodiment is described based on three eNBs, it should be understood that the embodiment may also be modified in such a way as to include two eNBs or four or more eNBs. The MMEs/S-GWs 120-1 and 120-2 may be separated into MMEs and S-GWs.

The eNBs 110-1, 110-2, and 110-3 are referred to as access nodes of a cellular network and provide wireless access to UE devices to connect to a network. That is, the eNBs 110-1, 110-2, and 110-3 support connection between the UE devices and a core network. According to various embodiments of the present invention, the eNB A (110-1) provides the UE with the dual connectivity via the AP 150.

The MMEs/S-GWs 120-1 and 120-2 manage the mobility of UE. The MMEs/S-GWs 120-1 and 120-2 may also perform the authentication for UE to connect to a network, bearer management, etc. The MMEs/S-GWs 120-1 and 120-2 process packets transmitted from the eNB 220 or packets to be forwarded to the eNBs 110-1, 110-2, and 110-3.

The AP 150 is an access node of a WLAN and provides wireless access to UE devices. In particular, according to various embodiments of the present invention, the AP 150 is capable of providing UE with the WLAN-based connection for dual connectivity, according to the control of the eNB A (110-1). According to various embodiments of the present invention, the AP 150 may be included in the eNB A (110-1) or may be connected to the eNB A(1.10-1) via a separate interface. In this case, the eNB A (110-1) is capable of transmitting: part of the downlink data to the UE; or the other data to the UE via the AP 150. The UE is capable of transmitting: part of the uplink data to the eNB A (110-1); and the other data to the AP 150.

UE is capable of connecting to a cellular network via the eNB A (110-1). According to an embodiment of the present invention, the eNB A (110-1) additionally sets the UE to connect to the AP 150, thereby enabling the UE to make a communication on a broader band. Although a core network entity (e.g., MME, S-GW, packet data network gateway (P-GW), etc.) does not recognize that dual connectivity has been set by additionally using the AP 150 in a wireless area, it may provide services. In this case, the dual connectivity is called LTE-WLAN aggregation (or carrier aggregation (CA) or integration).

When the entity provides the dual connectivity via the AP 150, a connection to transmit data needs to be determined. For example, in the case of downlink, the eNB A (110-1) receives data from a core network and determines whether it will transmit the data directly or via a WLAN. In the case of uplink, the UE determines a path to transmit data and transmits the data to the core network.

Figure 2:
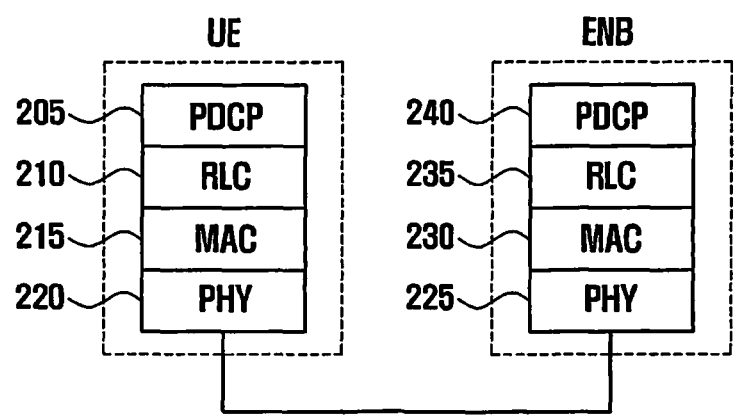
FIG. 2 is a diagram of a radio protocol stack in an LTE system according to the present invention.

FIG. 2 is a diagram of a radio protocol stack in an LTE system according to the present invention.

With reference to FIG. 2, UE and ENB have Packet Data Convergence Protocol (PDCP) 205 and 240, Radio Link Control (RLC) 210 and 235, and Medium Access Control (MAC) 215 and 230, respectively. PDCP 205 and 240 compress/decompress the IP header. RLC 210 and 235 reconfigure PDCP packet data unit (PDU) in proper size. MAC 215 and 230 connect to a number of RLC layer devices configured in one UE device. MAC 215 and 230 multiplex RLC PUDs to MAC PDU, and de-multiplex RLC PDUs from MAC PDU. Physical layers (PHY) 220 and 225 in UE and eNB channel-code and modulate data from the higher layers, create OFDM symbols, and transmit them via a wireless channel. In addition, PHY 220 and 225 demodulate and channel-decode OFDM symbols received via a wireless channel, and transfer them to the higher layers. In addition, the PHY uses Hybrid ARQ (HARQ) to perform additional error correction. The receiver transmits, to the transmitter, a 1-bit signal for a condition as to whether it has received a packet transmitted from the transmitter, which is called HARQ ACK/NACK information. Downlink HARQ ACK/NACK information in response to the uplink transmission is transmitted via a physical channel, Physical Hybrid-ARQ Indicator Channel (PHICH). Uplink HARQ ACK/NACK information in response to the downlink transmission is transmitted via a physical channel, Physical Uplink Control Channel (PUCCH) or Physical Uplink Shared Channel (PUSCH).

Figure 3:
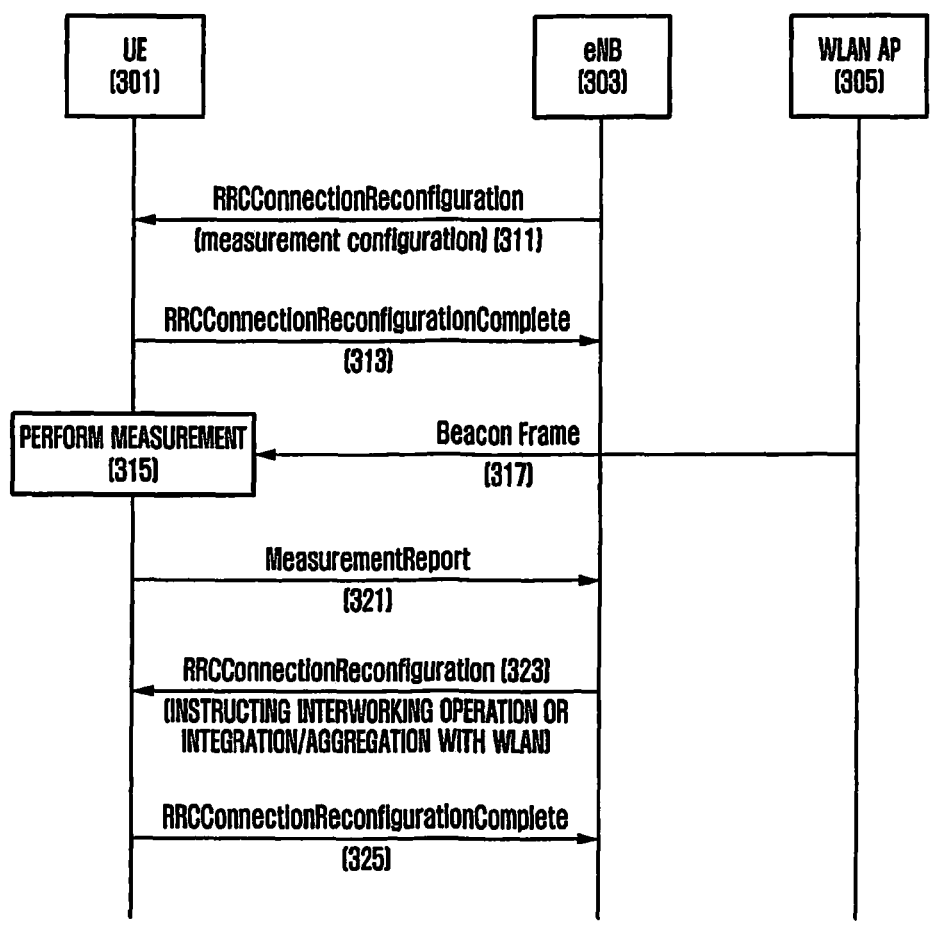
FIG. 3 is a flow diagram showing the flow of messages between UE and eNB using a measurement object indicator for a WLAN according to Embodiment 1 of the present invention.

FIG. 3 is a flow diagram showing the flow of messages between UE and eNB using a measurement object indicator for a WLAN according to the present invention.

In the embodiment, it is assumed that UE 301 is connected to the LTE eNB 303 (RRC_CONNECTED). In this case, UE and eNB may transmit/receive data to/from each other.

The eNB 303 is capable of transmitting a message instructing to measure nearby WLANs to the UE 301 in order to configure the interworking operation or the integration/aggregation between LTE and WLAN in operation 311. The measurement instruction message may contain measurement object information and report configuration information regarding a time and a form to report a corresponding measurement object. The details of the measurement object may contain a WLAN AP identifier (e.g., SSID, BSSID, etc.) and/or a WLAN frequency. In the embodiment, the eNB is capable of instructing the UE to measure a WLAN frequency by combining the following.

Country
Operating Class
Channel number

The IEEE 802.11 specification as a WLAN standard defines operating class and a channel set of channel numbers in the operating class according to countries. In the case of the US, part of the operating class is defined as in the following Table 1.

TABLE 1

| Operating class | Global Operating class (see Table E-4) | Channel starting frequency (GHz) | Channel spacing (MHz) | Channel set | Behavior limits set |
|---|---|---|---|---|---|
| 1 | 115 | 5 | 20 | 36, 40, 44, 48 | |
| 2 | 118 | 5 | 20 | 52, 56, 60, 64 | DFS_50_100_ Behavior |
| 3 | 124 | 5 | 20 | 149, 153, 157, 161 | Nomadic- Behavior |
| 4 | 121 | 5 | 20 | 100, 104, 108, 112, 116, 120, 124, 128, 132, 136, 140 | DFS_50_100_ Behavior |
| 5 | 125 | 5 | 20 | 149, 153, 157, 161, 165 | LicenseExempt- Behavior |
| 6 | 103 | 4.9375 | 5 | 1, 2, 3, 4, 5, 6, 7, 8, 9, 10 | |

TABLE 1-continued

| Operating class | Global Operating class (see Table E-4) | Channel starting frequency (GHz) | Channel spacing (MHz) | Channel set | Behavior limits set |
|---|---|---|---|---|---|
| 7 | 103 | 4.9375 | 5 | 1, 2, 3, 4, 5, 6, 7, 8, 9, 10 | |
| 8 | 102 | 4.89 | 10 | 11, 13, 15, 17, 19 | |
| 9 | 102 | 4.89 | 10 | 11, 13, 15, 17, 19 | |
| 10 | 101 | 4.85 | 20 | 21, 25 | |
| 11 | 101 | 4.85 | 20 | 21, 25 | |
| 12 | 81 | 2.407 | 25 | 1, 2, 3, 4, 5, 6, 7, 8, 9, 10, 11 | LicenseExempt-Behavior |
| 13 | 94 | 3.000 | 20 | 133, 137 | CCA-EDBehavior |
| 14 | 95 | 3.000 | 10 | 132, 134, 136, 138 | CCA-EDBehavior |
| 15 | 96 | 3.0025 | 5 | 131, 132, 133, 134, 135, 136, 137, 138 | CCA-EDBehavior |
| 16$^a$ | | 5.0025 | 5 | 170-184 | ITS_nonmobile operations, ITS_mobile_operations |
| 17$^{a, b}$ | | 5 | 10 | 171-184 | ITS_nonmobile operations, ITS_mobile_operations |
| 18$^{a, b}$ | | 5 | 20 | 172-183 | ITS_nonmobile operations, ITS_mobile_operations |
| 19-21 | Reserved | Reserved | Reserved | Reserved | Reserved |
| 22 | 116 | 5 | 40 | 36, 44 | PrimaryChannel-LowerBehavior |
| 23 | 119 | 5 | 40 | 52, 60 | PrimaryChannel-LowerBehavior |
| 24 | 122 | 5 | 40 | 100, 108, 116, 124, 132 | PrimaryChannel-LowerBehavior, DFS_50_100_Behavior |
| 25 | 126 | 5 | 40 | 149, 157 | PrimaryChannel-LowerBehavior |
| 26 | 126 | 5 | 40 | 149, 157 | LicenseExempt-Behavior, PrimaryChannel-LowerBehavior |
| 27 | 117 | 5 | 40 | 40, 48 | PrimaryChannel-UpperBehavior |
| 28 | 120 | 5 | 40 | 56, 64 | PrimaryChannel-UpperBehavior |
| 29 | 123 | 5 | 40 | 104, 112, 120, 128, 136 | Nomadic-Behavior, PrimaryChannel-UpperBehavior, DFS_50_100_Behavior |

The WLAN channel frequency is calculated as in the following equation, referring to table 1.

Channel center frequency=Channel starting frequency+5×nch(MHz), where nch=1, . . . ,200.

In the case of {Country, Operating Class, Channel number}={US, 4, 120}, this means that country is US and Operating Class is number 4. Therefore, referring to item number 4 of Operating Class in Table 1, Channel starting frequency is 5 GHz=5000 MHz. In addition, since the channel number is 120, the frequency of an actual channel is 5600 MHz (=5000+5·120).

When all the items, Country, Operating Class, and Channel number, are used, only one frequency may be indicated. When Country and Operating Class are used, the UE is instructed to measure all Operating Classes in the Channel Set. For example, when UE is signaled with the case of {Country, Operating Class, Channel number}={US, 4, 120}, only a frequency of 5600 MHz may be indicated. When UE is signaled with the case of {Country, Operating Class}={US, 4}, it may be instructed to measure a total of 11 frequencies, i.e., 5500, 5520, . . . , 5700 MHz.

The individual fields, Country, Operating Class, and Channel number may be signaled in the following methods.

Country
  Alternative 1: 3 Octets (as a bit string; according to ISO/IEC 3166-1); or
  Alternative 2: N bits or 1 Octet Integer
Operating Class
  1 Octet Integer
Channel number
  Alternative 1: List of Integer for each channel
  Alternative 2: Variable-size bitmap according to the Operating Class For example, a field of country may be encoded with 3 bytes according to the ISO/IEC 3166-1 specification defined as in the IEEE standard. That is, a country or non-country entity that UE/WLAN AP is running on may be identified by 3 bytes. For the country entity, the first and second octets of the string correspond to two country codes described in the ISO/IEC 3166-1 and the third octet corresponds to one of the following:

ASCII space character, (when regulations for the operations of UE/WLAN AP include all the environments for the current frequency band of the country);
ASCII '0' character, (when regulations for the operations of UE/WLAN AP are related to outdoor environments);
ASCII 'I' character, (when regulations for the operations of UE/WLAN AP are related to indoor environments);
ASCII 'X' character, (when UE/WLAN AP operates in a non-country entity, the first and second octets of the non-country entity correspond to two ASCII 'XX' characters); and
Binary representation of a table number (refer to Table 1) of the operating class in use.

In the current IEEE standard, the field of country is defined for only four countries. Therefore, the country field may employ a format of two bits (representing four countries: 00, 01, 10, 11) or a format of 1 byte-integer.

Alternatively, for the country field, when Mobile Country Code (MCC), contained in the Public Land Mobile Network Identity PLMN ID of an LTE eNB, is used, the transmission may be omitted. For example, in a state where System Information Block (SIB) that LTE eNB broadcasts to UE in the coverage area carries MCC information in the PLMN and the MCC information is a value corresponding to the US (i.e., 310, 311, 312, 313, 314, 315, 316), when UE is instructed to measure a WLAN frequency without the information regarding the country, it may calculate the measured frequency assuming the country value is a value corresponding to the US. The MCC value is defined in the COMPLEMENT TO ITU-T RECOMMENDATION E.212 (11/98) of ITU-T.

Operating Class may employ a format of 1 byte-integer, for example.

The field of channel number may employ a format of a list of 1 byte-integer for each channel. For example, the channel number of {Country, Operating Class}={US, 4} may be indicated in the format of {100, 104, 108, 112, 116, 120, 124, 128, 132, 136, 140}. When the format described above is used and 11 channel numbers are employed, a resource of 11 bytes is required. In order to reduce the bytes, a format of bitmap according to Operating Class may be considered. For example, when all channel numbers of {Country, Operating Class}={US, 4} are indicated, since the channel number of {Country, Operating Class}={US, 4} is 11, it may be indicated using a bitmap of a length of 11 bits. An example of the bitmap is illustrated in FIG. 25A. For example, when two channel numbers of {Country, Operating Class}={US, 4}, i.e., {120, 140}, are indicated, since the channel number of {Country, Operating Class}={US, 4} is 11, it may employ a bitmap of a length of 11 bits and may be indicated in such a way that the bit digits to be indicated are set to '1'. An example of the bitmap is illustrated in FIG. 25B. For example, when all channel numbers of {Country, Operating Class}={US, 1} are indicated, since the channel number of {Country, Operating Class}={US, 1} is 4, it may be indicated using a bitmap of a length of 4 bits, thereby instructing the UE to efficiently indicate the measurement frequencies. An example of the bitmap is illustrated in FIG. 25C.

When measurement frequencies are indicated using Country, Operating Class, and Channel number, a frequency to be used for WLAN may be defined in the future IEEE standard, using the Country, Operating Class, and Channel number values without change. Therefore, the method is advantageous because it can instruct to measure frequencies to be used for WLAN defined in new IEEE standard without changing the specification of the 3GPP standard.

The report configuration information, comprised in the measurement instruction message transmitted in operation 311 of FIG. 3, enables UE to report the measurement result of a measurement object, periodically or when a specified condition is satisfied. Examples of a specified condition are as follows.

Event A1: Serving becomes better than absolute threshold.
Event A2: Serving becomes worse than absolute threshold.
Event A3: Neighbor becomes amount of offset better than PCell.
Event A4: Neighbor becomes better than absolute threshold.
Event A5: PCell becomes worse than absolute threshold1 AND Neighbor becomes better than another absolute threshold2.
Event A6: Neighbor becomes amount of offset better than SCell.

That is, when the level of signal strength/quality of a current LTE cell is greater or less than a threshold or the level of signal strength/quality in a neighboring cell (or a WLAN) is greater or less than a threshold, UE may perform the reporting operation to the eNB. The measurement instruction message may be transmitted via a Radio Resource Control (RRC) layer message, RRCConnectionReconfiguration. When UE receives the RRCConnectionReconfiguration message in operation 311, it transmits, to the eNB, the acknowledgement message notifying the successful reception of the message, i.e., an RRC layer message, e.g., RRCConnectionReconfigurationComplete, in operation 313.

The UE measures neighboring WLAN signals according to the instruction in operation 315. The UE may use a beacon message transmitted from a WLAN AP 305 to measure neighboring WLAN signals. When the UE has measured signals and ascertains that a report condition configured as in operation 311 is satisfied, it reports the measurement result to the eNB in operation 321. The UE may use an RRC layer message to report the measurement result, e.g., MeasurementReport.

When receiving the report message of the measurement result, the eNB is capable of transmitting, to the UE, a message for instructing the UE to additionally use or move to a WLAN, considering the reported signal strength/quality, etc., so that the UE can perform the interworking operation or the integration/aggregation with the reported WLAN AP, in operation 323. The instruction message may comprise an identifier of a WLAN as a destination, e.g., SSID, BSSID, etc. The instruction message may be transmitted via an RRC layer message, RRCConnectionReconfiguration. When the UE receives the message, it transmits, to the eNB, the acknowledgement message notifying the successful reception of the message, i.e., an RRC layer message, e.g., RRCConnectionReconfigurationComplete, in operation 325.

Figure 4:
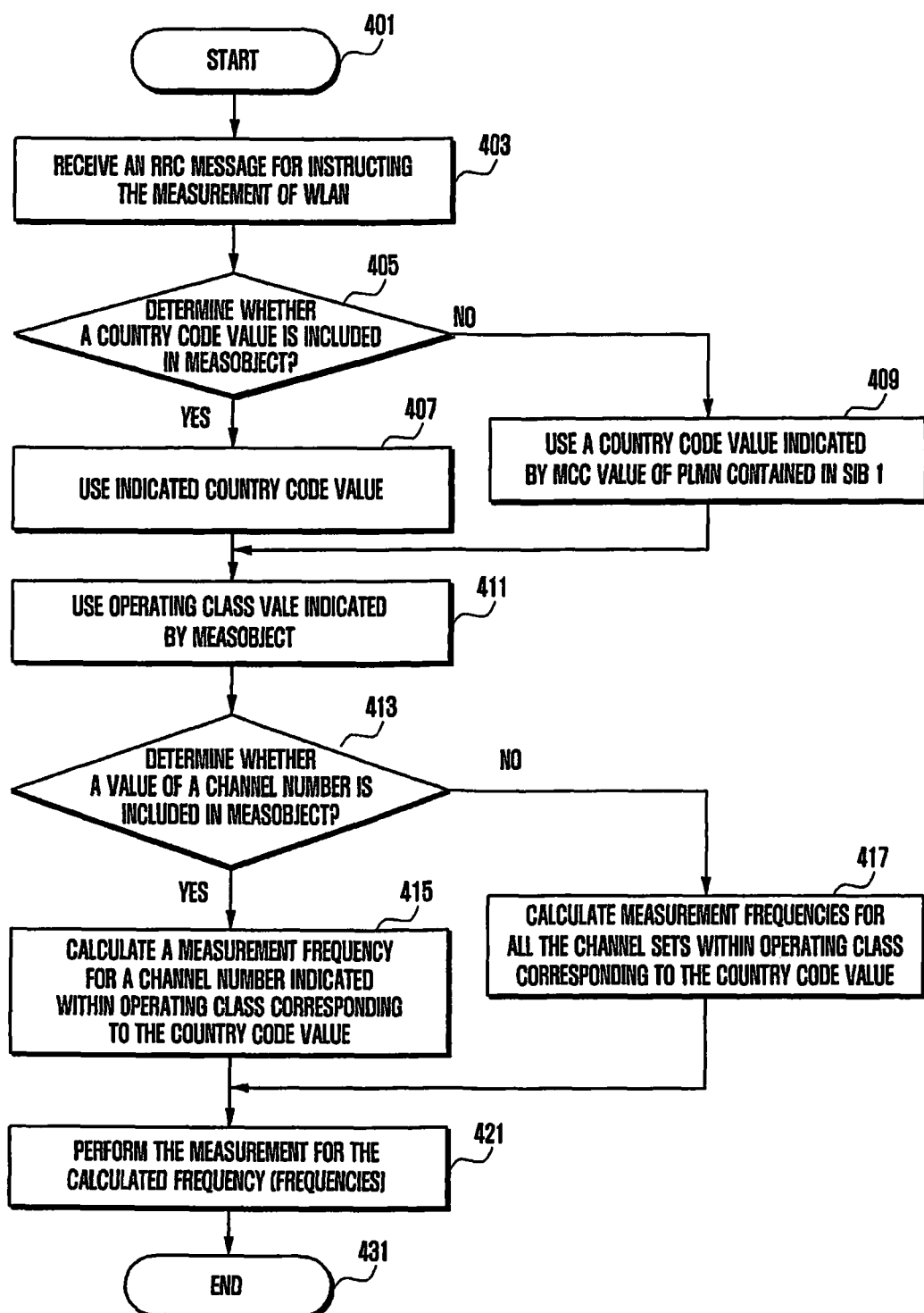
FIG. 4 is a flow diagram that describes a method for UE to calculate a measurement object frequency when the UE receives a measurement object indicator for a WLAN according to Embodiment 1 of the present invention.

FIG. 4 is a flow diagram that describes a method for UE to calculate a measurement object frequency when the UE receives a measurement object indicator for WLAN according to the present invention.

UE is capable of receiving, from the eNB, an RRC message for instructing the measurement of a WLAN in operation 403. UE is capable of determining whether measurement object information representing a measurement frequency, comprised in the measurement instruction message, includes information regarding a country in operation 405. When UE ascertains that measurement object information includes information regarding a country in operation 405, it uses the included value of a country in operation 407. On the other hand, when UE ascertains that measurement object information does not include information regarding a country in operation 405, it may calculate the value of a country by using MCC information comprised in a service provider's identifier, PLMN ID, of SIB that the LTE eNB broadcasts to UE in the coverage area in operation 409. For example, in a state where MCC of the PLMN ID corresponds to a value of the US (i.e., 310, 311, 312, 313, 316), when UE is instructed to measure a WLAN frequency without the information regarding a country, it may calculate the measurement frequency assuming the country value is a value corresponding to the US.

When the information regarding a country is determined as in operation 407 or 409, the UE is capable of using Operating Class comprised in the measurement object in operation 411. When the measurement object information comprises information regarding an explicit channel number in operation 413, the UE is capable of calculating a measurement frequency for a channel number indicated within operating class corresponding to the value of a country which is received or calculated in operation 415. The calculation of a measurement frequency refers to the method described via the flow chart shown in FIG. 3. When the measurement object information does not comprise information regarding an explicit channel number, the UE is capable of calculating measurement frequencies in all channel sets within operating class corresponding to the value of a country which is received or calculated in operation 417. The UE is capable of performing the measurement for the calculated frequency (frequencies) in operation 421.

Figure 5:
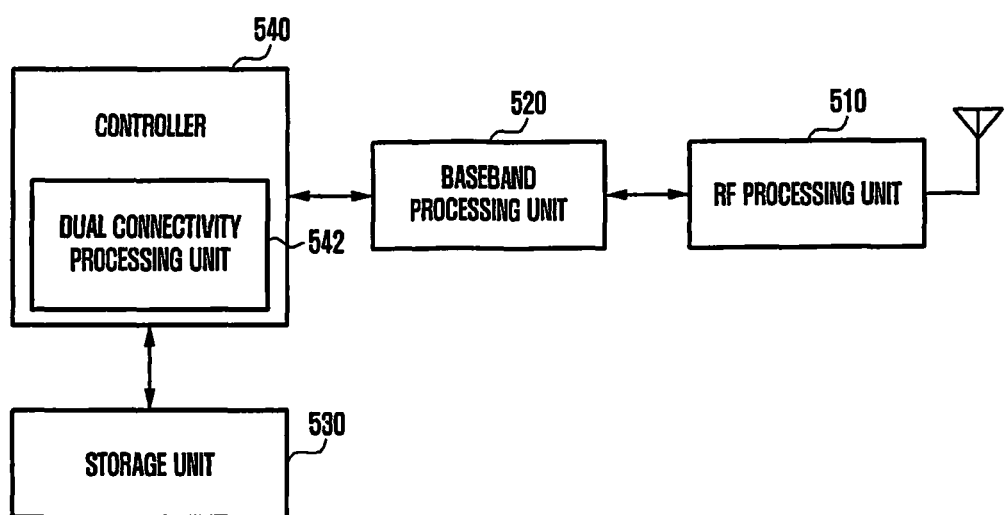
FIG. 5 is a block diagram showing the configuration of UE in a wireless communication system according to Embodiment 1 of the present invention.

FIG. 5 is a block diagram showing the configuration of UE in a wireless communication system according to an embodiment of the present invention.

With reference to FIG. 5, the UE includes a Radio Frequency (RF) processing unit 510, a baseband processing unit 520, a storage unit 530, and a controller 540.

The RF processing unit 510 performs functions related to the transmission/reception of signals via a wireless channel, e.g., the conversion of frequency band, the amplification, etc. The RF processing unit 510 up-converts baseband signals output from the baseband processing unit 520 into RF band signals and transmits the RF signals via an antenna. The RF processing unit 510 down-converts RF band signals received via the antenna into baseband signals. The RF processing unit 510 is capable of including a transmission filter, a reception filter, an amplifier, a mixer, an oscillator, a digital to analog convertor (DAC), an analog to digital convertor (ADC), etc. Although the embodiment is shown in FIG. 5 so that the UE includes only one antenna, it should be understood that the UE may be implemented to include a number of antennas. The RF processing unit 510 may also be implemented to include a number of RF chains. The RF processing unit 510 is capable of performing a beamforming operation. In order to perform a beamforming function, the RF processing unit 510 is capable of adjusting the phase and amplitude of individual signals transmitted/received via a number of antennas or antenna elements.

The baseband processing unit 520 performs the conversion between baseband signals and bitstream according to a physical layer specification of the system. For example, in the transmission of data, the baseband processing unit 520 encodes and modulates a transmission bitstream, thereby creating complex symbols. In the reception of data, the baseband processing unit 520 demodulates and decodes baseband signals output from the RF processing unit 510, thereby restoring a reception bitstream. For example, in the data transmission according to the orthogonal frequency division multiplexing (OFDM), the baseband processing unit 520 encodes and modulates a transmission bitstream to create complex symbols, maps the complex symbols to sub-carriers, and configures OFDM symbols through the inverse fast Fourier transform (IFFT) operation and the cyclic prefix (CP) insertion. In the data reception, the baseband processing unit 520 splits baseband signals output from the RF processing unit 510 into OFDM symbol units, restores signals mapped to sub-carriers through the fast Fourier transform (FFT) operation, and then restores a reception bitstream through the demodulation and the decoding operation.

The baseband processing unit 520 and the RF processing unit 510 perform the transmission and reception of signals as described above. Accordingly, the baseband processing unit 520 and the RF processing unit 510 may also be called a transmitter, a receiver, a transceiver, a communication unit, etc. In addition, the baseband processing unit 520 and/or the RF processing unit 510 may include a number of communication modules to support wireless access technologies that differ from each other. Alternatively, the baseband processing unit 520 and/or the RF processing unit 510 may include different communication modules to process signals of different frequency bands. Examples of the wireless access technologies include wireless LAN (e.g., IEEE 802.11), a cellular network (e.g., LTE), etc. Examples of the different frequency bands include super high frequency (SHF) (e.g., 2.5 GHz band, 5 GHz band, etc.), millimeter wave (mmW) (e.g., 60 GHz band), etc.

The storage unit 530 stores a default program for operating the UE, applications, settings, data, etc. In particular, the storage unit 530 is capable of storing information related to a second access node (e.g., AP) which performs wireless communication using a second wireless access technology (e.g., WLAN network). The storage unit 530 provides the stored data according to the request of the controller 540.

The controller 540 controls all operations of the UE. For example, the controller 540 controls the baseband processing unit 520 and the RF processing unit 510 to perform the transmission/reception of signals. The controller 540 controls the storage unit 530 to store/read data therein/therefrom. To this end, the controller 540 is capable of including at least one processor. For example, the controller 540 is capable of including a communication processor (CP) for controlling the communication and an application processor (AP) for controlling higher layers such as applications. According to embodiments of the present invention, the controller 540 is capable of including a dual connectivity processing unit 542 for processing operations in the dual connectivity mode. For example, the controller 540 is capable of controlling the UE to perform the functions and the procedure described above referring to FIG. 2. In the embodiment, the controller 540 performs the following operations.

According to embodiments of the present invention, UE is capable of performing operations of the method shown in FIG. 3 under the control of the controller 540. For example, when the controller 540 receives a WLAN measurement instruction message from the eNB, it analyzes the message as in the method shown in FIG. 4, calculates a frequency to be measured, and performs the measurement for the calculated frequency. When the controller 540 ascertains that a preset condition is satisfied based on the report configuration information comprised in the measurement instruction message, it is capable of reporting the measurement result to the eNB.

Figure 6:
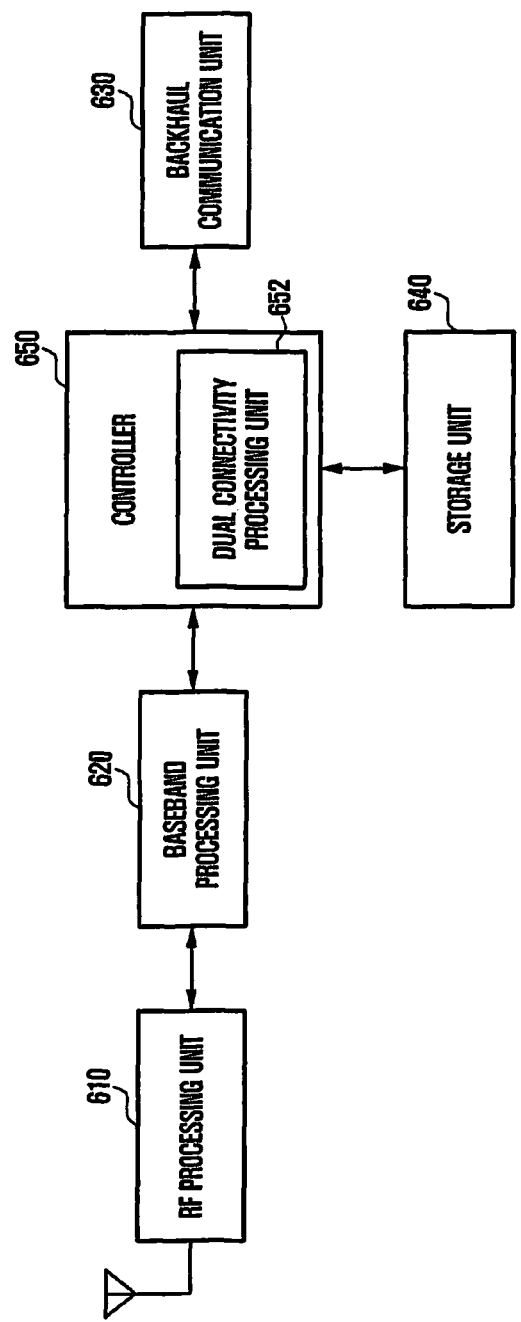
FIG. 6 is a block diagram showing an ENB in a wireless communication system according to Embodiment 1 of the present invention.

FIG. 6 is a block diagram showing an ENB in a mobile communication system according to an embodiment of the present invention.

As shown in FIG. 6, the ENB includes an RF processing unit 610, a baseband processing unit 620, a backhaul communication unit 630, a storage unit 640, and a controller 650.

The RF processing unit 610 performs functions related to the transmission/reception of signals via a wireless channel, e.g., the conversion of frequency band, the amplification, etc. The RF processing unit 610 up-converts baseband signals output from the baseband processing unit 620 into RF band signals and transmits the RF signals via an antenna. The RF processing unit 610 down-converts RF band signals received via the antenna into baseband signals. The RF processing unit 610 is capable of including a transmission filter, a reception filter, an amplifier, a mixer, an oscillator, a DAC, an ADC, etc. Although the embodiment is shown in FIG. 6 so that the ENB includes only one antenna, it should be understood that the ENB may be implemented to include a number of antennas. The RF processing unit 610 may also be implemented to include a number of RF chains. The RF processing unit 610 is capable of performing a beamforming operation. In order to perform a beamforming function, the RF processing unit 610 is capable of adjusting the phase and amplitude of individual signals transmitted/received via a number of antennas or antenna elements.

The baseband processing unit 620 performs the conversion between baseband signals and bitstream according to a physical layer specification of a first wireless access technology (e.g., cellular network). For example, in the data transmission, the baseband processing unit 620 encodes and modulates a transmission bitstream, thereby creating complex symbols. In the data reception, the baseband processing unit 620 demodulates and decodes baseband signals output from the RF processing unit 610, thereby restoring a reception bitstream. For example, in the data transmission according to the orthogonal frequency division multiplexing (OFDM), the baseband processing unit 620 encodes and modulates a transmission bitstream to create complex symbols, maps the complex symbols to sub-carriers, and configures OFDM symbols through the inverse fast Fourier transform (IFFT) operation and the cyclic prefix (CP) insertion. In the data reception, the baseband processing unit 620 splits baseband signals output from the RF processing unit 610 into OFDM symbol units, restores signals mapped to sub-carriers through the fast Fourier transform (FFT) operation, and then restores a reception bitstream through the demodulation and the decoding operation. The baseband processing unit 620 and the RF processing unit 610 perform the transmission and reception of signals as described above. Therefore, the baseband processing unit 620 and the RF processing unit 610 may also be called a transmitter, a receiver, a transceiver, a communication unit, a wireless communication unit, etc.

The backhaul communication unit 630 provides interfaces to communicate with other nodes in the network. That is, the backhaul communication unit 630 converts: a bitstream into a physical signal to be transmitted to other nodes of the ENB, e.g., another access node, a core network, etc.; and a physical signal received from the nodes into a bitstream.

The storage unit 640 stores a default program for operating the ENB, applications, settings, data, etc. In particular, the storage unit 640 is capable of storing information regarding a bearer allocated to the connected UE, a measurement result reported from the connected UE, etc. The storage unit 640 is capable of providing the dual connectivity function to UE or storing reference information to determine whether the ENB terminates the dual connectivity operation. The storage unit 640 provides the stored data according to the request of the controller 650.

The controller 650 controls all operations of the ENB. For example, the controller 650 controls the baseband processing unit 620, the RF processing unit 610 and the backhaul communication unit 630 to perform the transmission/reception of signals. The controller 650 controls the storage unit 640 to store/read data therein/therefrom. To this end, the controller 650 is capable of including at least one processor. In the embodiment, the controller 650 performs the following operations.

According to embodiments of the present invention, the eNB is capable of instructing UE to measure a frequency via a measurement instruction message comprising at least one of the following: Country, Operating Class, and Channel number, under the control of the controller 650. In this case, in order to reduce the consumption of transmission resources, the eNB may create and transmit the measurement instruction message without including Country or Channel number. The measurement instruction message may further comprise report configuration information.

Embodiment 2

Figure 7:
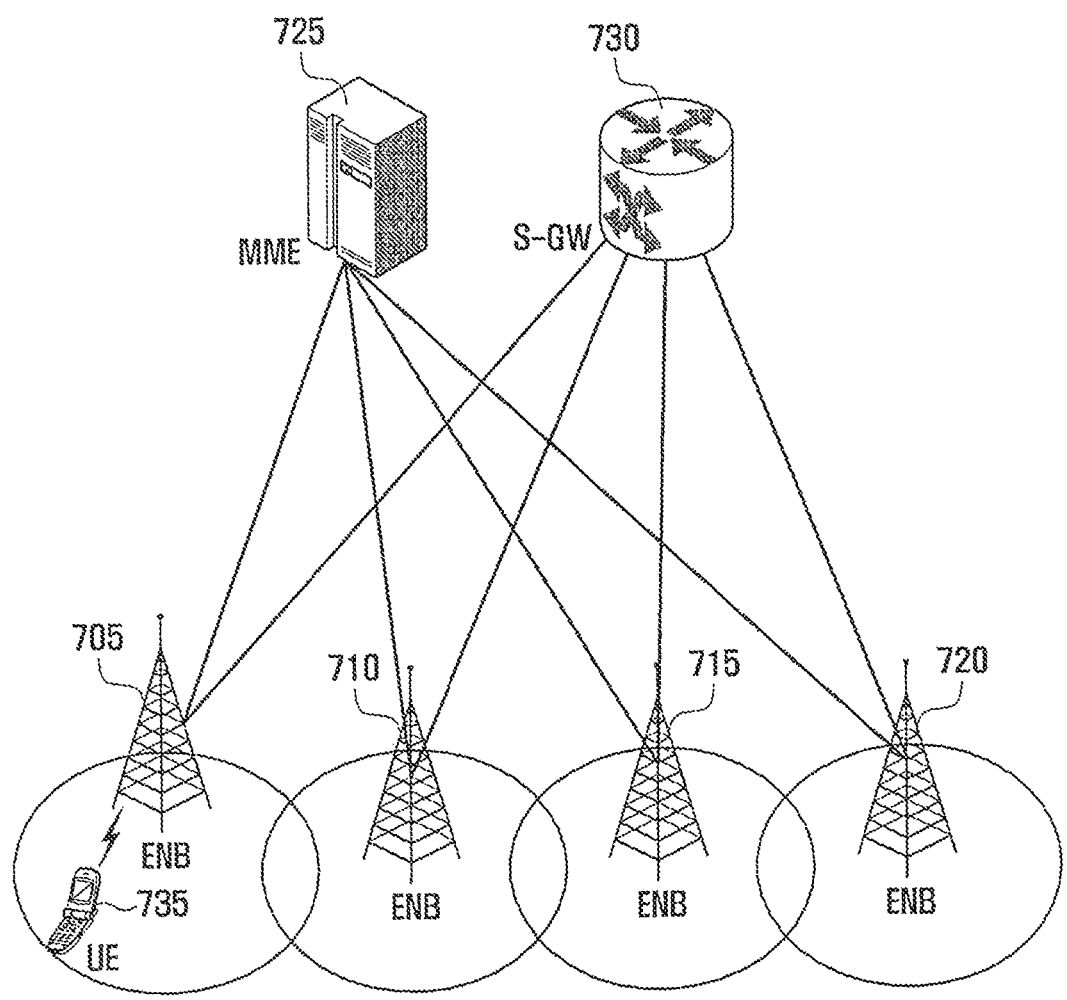
FIG. 7 is a diagram of a configuration of an LTE system according to the present invention.

With reference to FIG. 7, the LTE system configures the wireless access network, including evolved node Bs (called ENBs, eNBs, Node Bs or base stations) 705, 710, 715, and 720, a mobility management entity (MME) 725, and a serving-gateway (S-GW) 730. user equipment (UE) (which is also called a terminal) 735 is connected to an external network via the ENB 705, 710, 715, or 720 and the S-GW 730. ENBs 705 to 720 correspond to existing Node B of the universal mobile telecommunications system (UMTS). ENBs 705 to 720 are connected to UE 735 via wireless channels and are capable of performing more complicated functions than existing Node B. In an LTE system, since real-time services such as a voice over internet protocol (VoIP) service and all user traffic are serviced via shared channels, devices are required to collect information regarding states, such as buffer states of UE devices, available transmission power states, channel states, etc., and to make a schedule. This task is performed via ENBs 705 to 720. One ENB controls a number of cells. For example, in order to implement a transmission rate of 100 Mbps, an LTE system employs orthogonal frequency division multiplexing (OFDM) as a wireless access technology at a bandwidth of 20 MHz. It also employs adaptive modulation & coding (AMC) to determine modulation scheme and channel coding rate, meeting with the channel state of UE. The S-GW 730 is a device that provides data bearers. The S-GW 730 establishes or removes data bearers according to the control of the MME 725. The MME 725 manages the mobility of UE and controls a variety of functions. The MME 725 connects to a number of ENBs 705 to 720.

Figure 8:
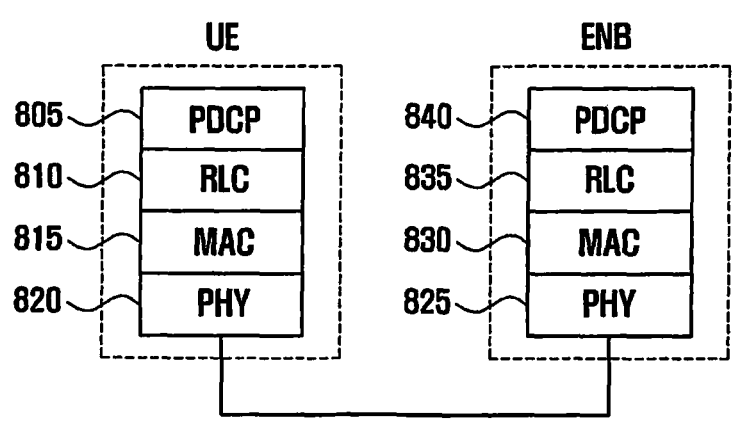
FIG. 8 is a diagram of a radio protocol stack in an LTE system according to the present invention.

With reference to FIG. 8, UE and ENB have Packet Data Convergence Protocol (PDCP) 805 and 840, Radio Link Control (RLC) 810 and 835, and Medium Access Control (MAC) 815 and 830, respectively. PDCP 805 and 840 compress/decompress the IP header. RLC 810 and 835 reconfigure PDCP packet data unit (PDU) in proper size and perform an Automatic Repeat reQuest (ARQ) operation. MAC 815 and 830 connect to a number of RLC layer devices configured in one UE device. MAC 815 and 830 multiplex RLC PUDs to MAC PDU, and de-multiplex RLC PDUs from MAC PDU. Physical layers (PHY) 820 and 825 in UE and ENB channel-code and modulate data from the higher layers, create OFDM symbols, and transmit them via a wireless channel. In addition, PHY 820 and 825 demodulate and channel-decode OFDM symbols transmitted via a wireless channel, and transfer them to the higher layers.

Dynamic pre-allocation as one of the latency reduction schemes is considered.

Pre-allocation is a technique that allows an ENB to allocate, although it has not received a transmission resource request from UE, uplink transmission resources to the UE. Pre-allocation causes a problem that an ENB allocates, although it has not received a transmission resource request, uplink transmission resources to UE that does not have data to be transmitted.

In the current specification (rule), although UE does not have data to be transmitted, when the UE is allocated an uplink grant, it is enforced to create and transmit a padding MAC PDU. The padding MAC PDU refers to an MAC PDU which includes only padding bits and padding BSR without including meaningful data. The rule is defined assuming that the frequency of occurrence of padding MAC PDU is extremely low.

The transmission rule of padding MAC PDU is advantageous because it assists an ENB to control the uplink transmission power and simplifies the implementation of a related ENB. When the ENB controls the transmission power for a UE device, it refers to the statistics of occurrence of HARQ ACK/NACK messages in response to MAC PDU transmitted from the UE. For example, when HARQ NACK has never occurred, it means that the current transmission power control method is proper. In contrast, when HARQ NACK occurs relatively frequently, it means that the uplink transmission power control method currently in use needs to be modified. Embodiments of the present invention provide new operations to UE which is allocated resources but does not perform the transmission since it does have data to be transmitted, thereby using the pre-allocation with efficiency. Since a legacy ENB expects a reverse transmission when resources are allocated, it is preferable that the legacy ENB does not employ new operations described above. In the following description, for the sake of convenience, when a transmission resource is available, the uplink transmission is unconditionally performed, which is called an unconditional transmission operation. In addition, although a transmission resource is available, the uplink transmission is performed only when it satisfies a preset condition, which is called a conditional transmission operation.

Embodiment 2-1

In various embodiments of the present invention, UE selectively employs an unconditional transmission operation or a conditional transmission operation according to the instruction of an ENB.

A condition as to whether UE employs an unconditional transmission operation or a conditional transmission operation needs to be determined, cooperating with the implicit release operation of Semi-Persistent Scheduling (SPS). The implicit release refers to a scheme that enables UE to release the configured uplink grant when the transmission of MAC PDU without MAC SDU (hereafter called 'Zero MAC SDU MAC PDU') is performed successively n times ('n' is a positive integer) via an SPS transmission resource. The implicit release is introduced to provide against the loss of SPS release signals.

Zero MAC SDU MAC PDU is created when UE does not have transmittable higher layer data. Therefore, when UE employs a conditional transmission operation, the implicit release is no longer functioning, which is disadvantageous. The current standard has been defined to be sure to set the implicit release for the use of SPS.

Various embodiments of the present invention are capable of selectively applying the conditional transmission operation to an SPS transmission resource or a normal transmission resource, considering a condition as to whether SPS is configured.

Figure 9:
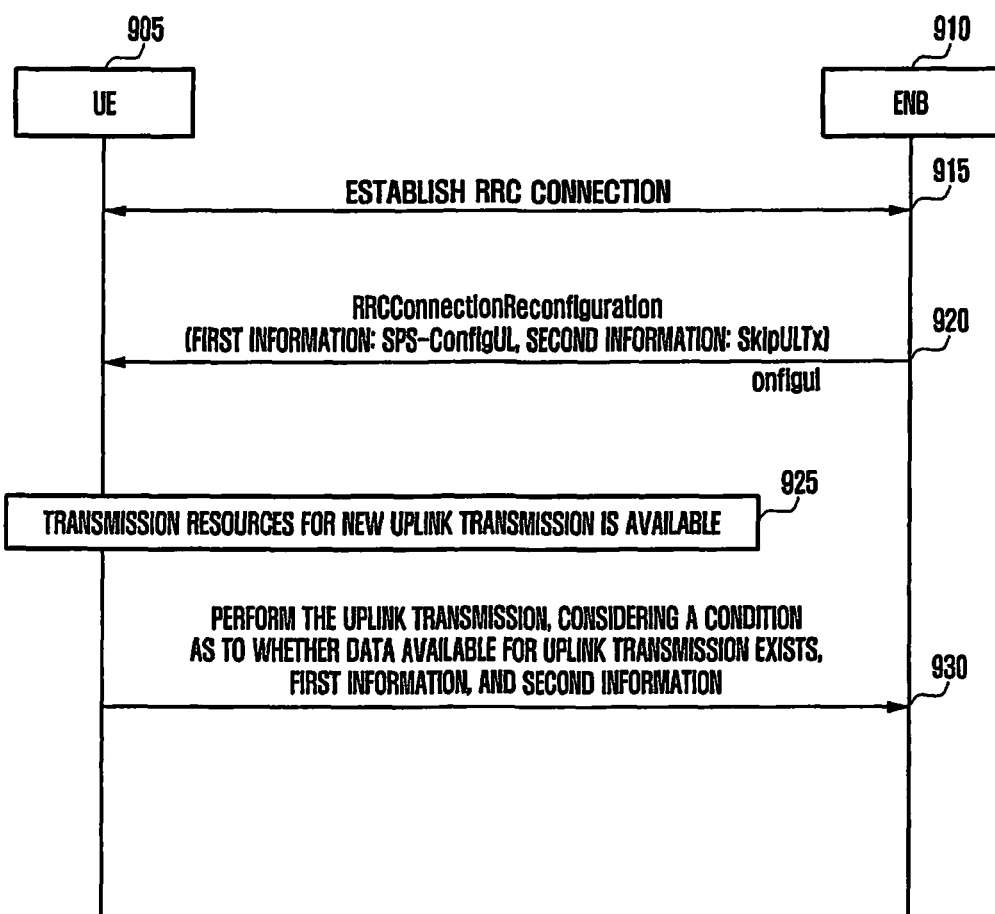
FIG. 9 is a flow diagram that describes the operations between UE and ENB according to Embodiment 2-1.

FIG. 9 is a flowchart that describes the operations between UE and ENB according to Embodiment 2-1.

In a mobile communication system including UE 905, an ENB 910, and other nodes, the UE establishes the RRC connection with the ENB in operation 915. Establishing the RRC connection between ENB and UE means that the ENB and UE configure a Signaling Radio Bearer (SRB) SRB therebetween and thus exchange RRC control messages with each other. The RRC connection is established via a random access process in such a way that: UE transmits an RRC connection establishment request message to an ENB; the ENB transmits an RRC connection establishment message to the UE; and the UE transmits an RRC connection establishment complete message to the ENB.

After establishing the RRC connection, the ENB 910 is capable of instructing the UE 905 to perform the RRC connection re-configuration in operation 920. The ENB is capable of transmitting the SPS configuration information to the UE via the RRC connection re-configuration message, and instructing the UE on the condition as to whether it employs the conditional transmission operation. The Information indicating a condition as to whether UE employs the conditional transmission operation may be comprised in the lower information of sps-ConfigUL or MAC-MainConfig of the RRCConnectionReconfiguration message, and may be defined as the format of ENUMERATED {SETUP}, called SkipUplinkTransmission (SkipULTx). For example, when sps-ConfigUL or MAC-MainConfig of the RRCConnection-Reconfiguration message received by the UE comprises SkipUplinkTransmission (SkipULTx) indicated by SETUP, it means that the UE is instructed to perform a conditional transmission operation. On the other hand, when sps-ConfigUL or MAC-MainConfig of the RRCConnectionReconfiguration message does not comprise SkipUplinkTransmission (SkipULTx), it means that the UE is instructed to perform an unconditional transmission operation.

The SPS configuration information is defined as follows.

```
SPS-Config ::=                          SEQUENCE {
semiPersistSchedC-RNTI C-RNTI OPTIONAL,        -- Need OR
sps-ConfigDL                            SPS-ConfigDL
OPTIONAL, -- Need ON
sps-ConfigUL                            OPTIONAL -- Need ON
}
....
SPS-ConfigUL ::=                        CHOICE {
release                                 NULL,
setup                                   SEQUENCE {
semiPersistSchedIntervalUL              ENUMERATED {
sf10, sf20, sf32, sf40, sf64, sf80,
sf128, sf160, sf320, sf640, spare6,
spare5, spare4, spare3, spare2,
spare1},
implicitReleaseAfter                    ENUMERATED
{e2, e3, e4, e8},
p0-Persistent                           SEQUENCE {
p0-NominalPUSCH-Persistent              INTEGER (-126..24),
p0-UE-PUSCH-Persistent                  INTEGER (-8..7)
} OPTIONAL,                             -- Need OP
twoIntervalsConfig ENUMERATED {true}
OPTIONAL, -- Cond TDD
....,
[[ p0-PersistentSubframeSet2-r12                       CHOICE {
release                                 NULL,
setup                                   SEQUENCE {
p0-NominalPUSCH-PersistentSubframeSet2-r12             INTEGER
(-126..24),
p0-UE-PUSCH-PersistentSubframeSet2-r12 INTEGER (-8..7)
}
} OPTIONAL -- Need ON
]]
}
}
N1PUCCH-AN-PersistentList ::=           SEQUENCE
(SIZE (1..4)) OF INTEGER (0..2047)
-- ASN1STOP
```

TABLE 2-1

SPS-Config field descriptions
 implicitReleaseAfter
  Number of empty transmissions before
implicit release, see TS 36.321 [6, 5.10.2]. Value
e2 corresponds to 2 transmissions, e3
corresponds to 3 transmissions and so on.
 n1PUCCH-AN-PersistentList, n1PUCCH-AN-PersistentListP1
  List of parameter: for antenna port P0
and for antenna port P1 respectively, see TS
36.213 [23, 10.1]. Field n1-PUCCH-AN-PersistentListP1
is applicable only if the
twoAntennaPortActivatedPUCCH-Format1a1b
in PUCCH-ConfigDedicated-v1020 is set to
true. Otherwise the field is not configured.
 numberOfConfSPS-Processes TABLE 2-1-continued The number of configured HARQ processes for Semi-Persistent Scheduling, see TS 36.321 [6].
    p0-NominalPUSCH-Persistent
      Parameter: . See TS 36.213 [23, 5.1.1.1], unit dBm step 1. This field is applicable for persistent scheduling, only. If choice setup is used and p0-Persistent is absent, apply the value of p0-NominalPUSCH for p0-NominalPUSCH-Persistent. If uplink power control subframe sets are configured by tpc-SubframeSet, this field applies for uplink power control subframe set 1.
    p0-NominalPUSCH-PersistentSubframeSet2
      Parameter: . See TS 36.213 [23, 5.1.1.1], unit dBm step 1. This field is applicable for persistent scheduling, only. If p0-PersistentSubframeSet2-r12 is not configured, apply the value of p0-NominalPUSCH-SubframeSet2-r12 for p0-NominalPUSCH-PersistentSubframeSet2. E-UTRAN configures this field only if uplink power control subframe sets are configured by tpc-SubframeSet, in which case this field applies for uplink power control subframe set 2.
    p0-UE-PUSCH-Persistent
      Parameter: . See TS 36.213 [23, 5.1.1.1], unit dB. This field is applicable for persistent scheduling, only. If choice setup is used and p0-Persistent is absent, apply the value of p0-UE-PUSCH for p0-UE-PUSCH-Persistent. If uplink power control subframe sets are configured by tpc-SubframeSet, this field applies for uplink power control subframe set 1.
    p0-UE-PUSCH-PersistentSubframeSet2
      Parameter: . See TS 36.213 [23, 5.1.1.1], unit dB. This field is applicable for persistent scheduling, only. If p0-PersistentSubframeSet2-r12 is not configured, apply the value of p0-UE-PUSCH-SubframeSet2 for p0-UE-PUSCH-PersistentSubframeSet2. E-UTRAN configures this field only if uplink power control subframe sets are configured by tpc-SubframeSet, in which case this field applies for uplink power control subframe set 2.
    semiPersistSchedC-RNTI
      Semi-persistent Scheduling C-RNTI, see TS 36.321 [6].
    semiPersistSchedIntervalDL
      Semi-persistent scheduling interval in downlink, see TS 36.321 [6]. Value in number of sub-frames. Value sf10 corresponds to 10 sub-frames, sf20 corresponds to 20 sub-frames and so on. For TDD, the UE shall round this parameter down to the nearest integer (of 10 sub-frames), e.g. sf10 corresponds to 10 sub-frames, sf32 corresponds to 30 sub-frames, sf128 corresponds to 120 sub-frames.
    semiPersistSchedIntervalUL
      Semi-persistent scheduling interval in uplink, see TS 36.321 [6]. Value in number of sub-frames. Value sf10 corresponds to 10 sub-frames, sf20 corresponds to 20 sub-frames and so on. For TDD, the UE shall round this parameter down to the nearest integer (of 10 sub-frames), e.g. sf10 corresponds to 10 sub-frames, sf32 corresponds to 30 sub-frames, sf128 corresponds to 120 sub-frames.
    twoIntervalsConfig
      Trigger of two-intervals-Semi-Persistent Scheduling in uplink. See TS 36.321 [6, 5.10]. If this field is present, two-intervals-SPS is enabled for uplink. Otherwise, two-intervals-SPS is disabled.

TABLE 2-2

| Conditional presence | Explanation |
| --- | --- |
| TDD | This field is optional present for TDD, need OR; it is not present for FDD and the UE shall delete any existing value for this field. |

When an uplink transmission resource allocated for new transmission is available in operation 925, UE determines whether the uplink transmission is performed in operation 930. The uplink transmission resource allocated for new transmission may be a transmission resource which is allocated via PDCCH addressed by a C-RNTI of UE or a transmission resource for SPS, i.e., configured UL grant.

UE: determines whether it performs the transmission via the uplink transmission resource (or whether it creates MAC PDU to be transmitted via the uplink transmission resource), considering a condition as to whether SPS-ConfigUL (first information) and SkipUplinkTransmission (second information) exit, a characteristic of an available transmission resource, a condition as to whether uplink data to be transmitted exists, a characteristic of uplink data to be transmitted, etc.; and performs or does not perform the uplink transmission, based on the determination in operation 930.

Figure 10:
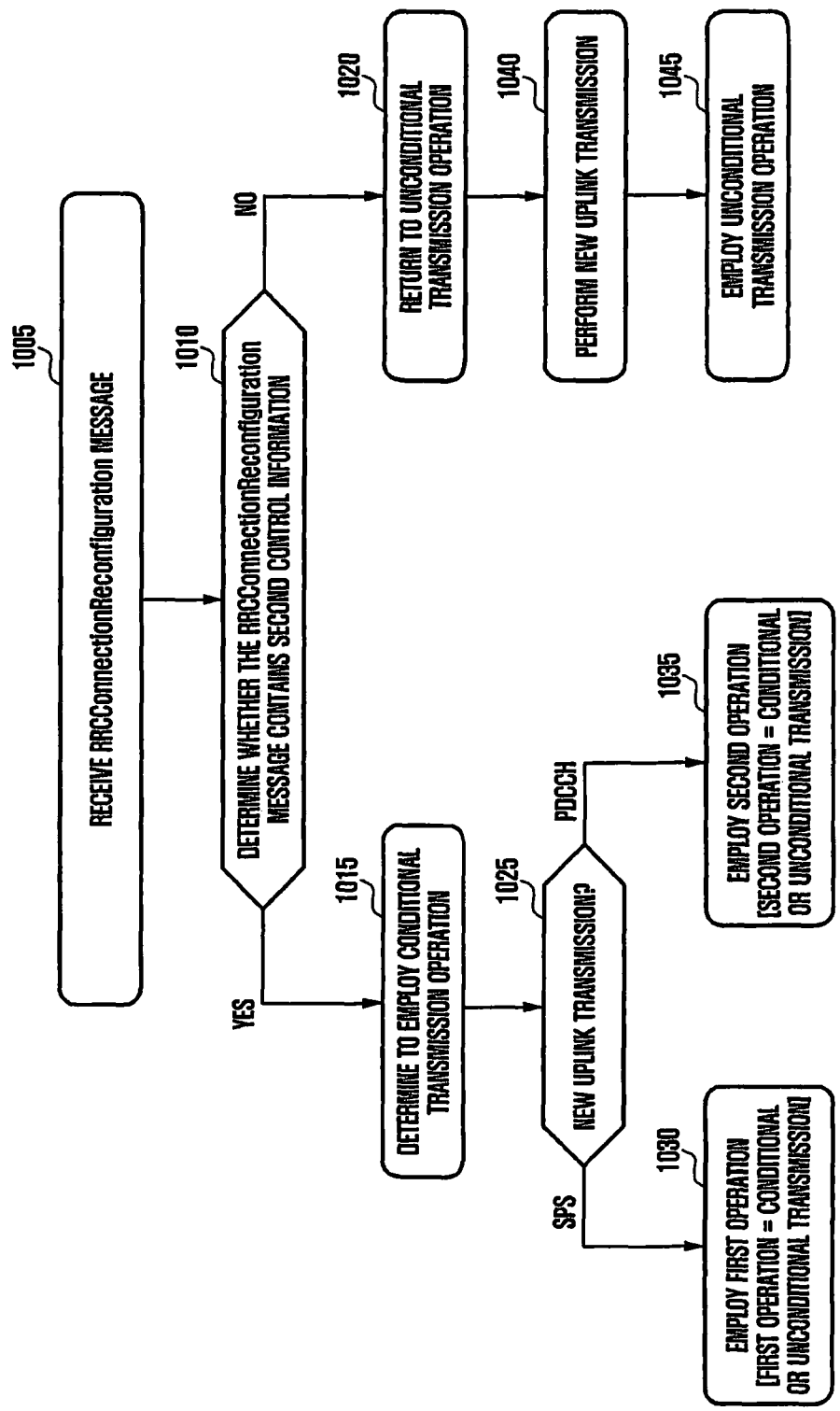
FIG. 10 is a flowchart that describes operations of UE according to Embodiment 2-1.

FIG. 10 is a flowchart that describes operations of UE according to Embodiment 2-1.

UE receives a control message, RRCConnectionReconfiguration, in operation 1005.

UE determines whether an IE of the control message comprises second control information in operation 1010.

When UE ascertains that an IE of the control message comprises second control information in operation 1010, it determines to apply the conditional transmission operation to the transmission and waits until a time that a new uplink transmission can be performed in operation 1015. When a new uplink transmission can be performed (e.g., when a configured uplink grant is available or an uplink grant is received via PDCCH), UE proceeds with operation 1025.

On the other hand, when UE ascertains that an IE of the control message does not comprise second control information in operation 1010, i.e., when UE employs the unconditional transmission operation, it may return to the unconditional transmission operation in operation 1020. That is, the conditional transmission operation is initiated when an RRC connection reconfiguration message including an IE where second control information is comprised is received. When an RRC connection reconfiguration message including an IE where second control information is not comprised is received, UE is released and returns to the unconditional transmission operation. After that, UE proceeds with operation 1040. The IE may be SPS-ConfigUL or MAC-MainConfig.

In operation 1025, UE determines whether the new uplink transmission is a transmission via an SPS transmission resource (or a new transmission via a configured reverse grant) or a transmission via an allocated uplink grant on PDCCH addressed by a C-RNTI (or a new transmission via a dynamically allocated transmission resource). When UE ascertains that the new uplink transmission is a transmission via an SPS transmission resource in operation 1025, it employs a first operation in operation 1030. When UE ascertains that the new uplink transmission is a transmission via an allocated uplink grant on PDCCH in operation 1025, it employs a second operation in operation 1035.

The first operation may be a conditional transmission operation or an unconditional transmission operation. The second operation may be a conditional transmission operation or an unconditional transmission operation.

Operations 1025, 1030, and 1035 mean that a conditional transmission operation may be employed selectively according to types of uplink transmission. For example, although second control information has been configured, a conditional transmission operation is applied to the uplink transmission only when the uplink transmission is a transmission via SPS, and an unconditional transmission operation is applied to the uplink transmission only when the uplink transmission is a transmission via a dynamically allocated transmission resource on PDCCH (when operation 1030 corresponds to a conditional transmission and operation 1035 corresponds to an unconditional transmission). Alternatively, the uplink transmission may employ: an unconditional transmission operation when the uplink transmission is a transmission via SPS; and a conditional transmission operation when the uplink transmission is a transmission via a dynamically allocated transmission resource on PDCCH. Alternatively, all the transmissions may employ a conditional transmission operation, regardless of types of transmission (when operation 1030 corresponds to an unconditional transmission and operation 1035 corresponds to a conditional transmission).

When an uplink grant allowing for a new uplink transmission is available in operation 1040, UE applies an unconditional transmission operation to the uplink transmission in operation 1045.

In the following description, rules of the conditional transmission operation and the unconditional transmission operation according to various embodiments of the present invention are explained.

[Conditional Transmission Operation]

When MAC SDU available for transmission exists or transmittable MAC control element (MAC CE) except for BSR included for padding (padding BSR) exists, UE performs the uplink transmission (or UE performs a following procedure for creating MAC PDU, considering that a valid uplink grant exists).

When MAC SDU available for transmission does not exist (i.e., data available for transmission does not exist in both PDCP device and RLC device) and transmittable MAC CE except for padding BSR does not exist, UE does not perform the uplink transmission (or UE does not perform a following procedure for creating MAC PDU, considering that a valid uplink grant does not exist).

Rule No. 2 of the conditional transmission operation may be modified in such a way that: although MAC SDU available for transmission does not exist and transmittable MAC CE except for padding BSR does not exist, when a serving cell to perform new transmission is scheduled, in the TTI instructed to perform new transmission, along with the transmission on PUCCH, such as HARQ ACK/NACK or CQU/PMI/RI, UE performs the uplink transmission; and in a state where MAC SDU available for transmission does not exist and transmittable MAC CE except for padding BSR does not exist, the uplink transmission may be omitted only when a simultaneous transmission along with the transmission on PUCCH is not scheduled in a corresponding TTI. Since the PUCCH transmission is performed using a PUCCH transmission resource and part of the PUSCH transmission resource, when UE does not perform the PUSCH transmission in the condition described above, the eNB may not correctly receive the PUCCH.

[Unconditional Transmission Operation]

When MAC CE or MAC SDU available for transmission exists, UE creates and transmits a general MAC PDU. When MAC CE or MAC SDU available for transmission does not exist, UE creates and transmits a padding MAC PDU configured with only padding and a padding BSR.

In the following description, rules related to the implicit release of SPS according to various embodiments of the present invention are explained.

According to various embodiments of the present invention, when the conditional transmission and the SPS have been configured, UE does not employ the implicit release of SPS. When the SPS has been configured, UE employs the implicit release of SPS. As described above, since the information, implicitReleaseAfter, is not omitted in the SPS configuration information, the implicitReleaseAfter is used or ignored according to a condition as to whether the conditional transmission is configured.

More specifically, when UE receives an RRC control message comprising first information, it determines whether the control message comprises second control information or has employed a conditional transmission operation (i.e., when UE received the second control information). When UE ascertains that the control message does not comprise second control information or has not employed a conditional transmission operation, it employs the implicit release, considering implicitReleaseAfter comprised in the first information (or uses the implicit release technique). On the other hand, when UE ascertains that the control message comprises second control information or has already employed a conditional transmission operation, it does not employ the implicit release, ignoring implicitReleaseAfter comprised in the first control information since the time when the UE received the second control information. That is, although UE transmits Zero MAC SDU MAC PDU a number of times, implicitReleaseAfter, via the SPS transmission resource, it does not release the SPS. The Zero MAC SDU MAC PDU is referred to as MAC PDU without MAC SDU.

In the following description, the padding MAC PDU and Zero MAC SDU MAC PDU are explained.

The Zero MAC SDU MAC PDU may comprise all the MAC CEs listed as follows.

TABLE 3

| Index | LCID values |
|---|---|
| 10110 | Truncated Sidelink BSR |
| 10111 | Sidelink BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

On the other hand, the padding MAC PDU may comprise padding MAC CEs and padding BSRs. The padding BSR may be Truncated BSR, Short BSR, or Long BSR, according to the size of padding space, as follows. Detailed BSRs are as follows.

TABLE 4

| Index | LCID values |
|---|---|
| 10110 | Truncated Sidelink BSR |
| 10111 | Sidelink BSR |
| 11100 | Truncated BSR |
| 11101 | Short BSR |
| 11110 | Long BSR |
| 11111 | Padding |

Embodiment 2-2

In various embodiments of the present invention, UE selectively employs an unconditional transmission operation or a conditional transmission operation according to the instruction of an ENB.

In various embodiments of the present invention, UE selectively employs an unconditional transmission operation or a conditional transmission operation according to types of a reverse transmission resource.

When UE can use a transmission resource to which a conditional transmission operation is applied, it determines whether the New Data Indicator (NDI) is toggled, based on the presence of data to be transmitted, and controls a condition as to whether it performs a new transmission.

The present invention is capable of selectively applying the conditional transmission operation to an SPS transmission resource or a normal transmission resource, considering a condition as to whether SPS is configured.

Figure 11:
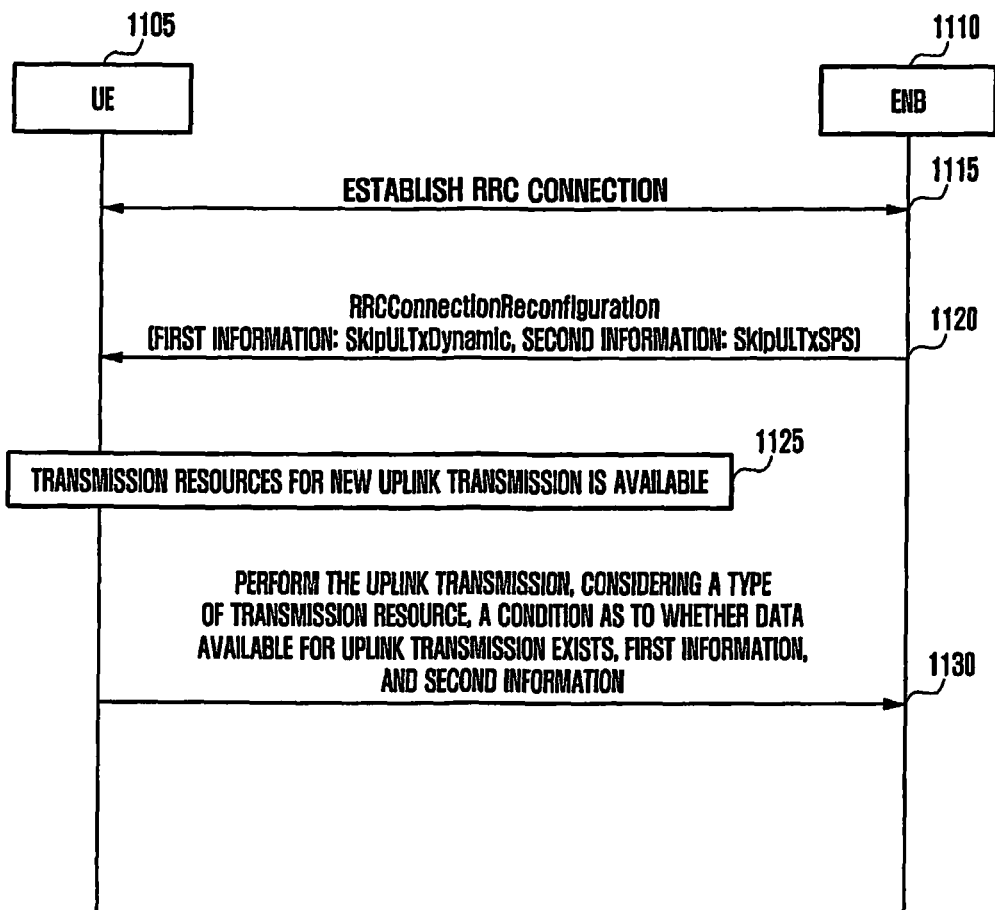
FIG. 11 is a flow diagram that describes the operations between UE and ENB according to Embodiment 2-2.

FIG. 11 is a flowchart that describes the operations between UE and ENB according to Embodiment 2-2.

In a mobile communication system including UE 1105, an ENB 1110, and other nodes, the UE establishes the RRC connection with the ENB in operation 1115. Establishing the RRC connection between ENB and UE means that the ENB and UE configure a Signaling Radio Bearer (SRB) SRB therebetween and thus exchange RRC control messages with each other. The RRC connection is established via a random access process in such a way that: UE transmits an RRC connection establishment request message to an ENB; the ENB transmits an RRC connection establishment message to the UE: and the UE transmits an RRC connection establishment complete message to the ENB.

After establishing the RRC connection, the ENB 1110 is capable of instructing the UE 1105 to perform the RRC connection re-configuration in operation 1120. The ENB is capable of providing the UE with first and second information via the RRC connection re-configuration message, instructing the UE to perform a conditional transmission operation.

The first information is referred to as information indicating a condition as to whether a conditional transmission operation is applied to a dynamic grant and is formed by 1 bit. When UE is signaled with 1 bit, the UE applies a conditional transmission operation to a dynamic grant. When UE is not signaled with 1 bit, the UE applies an unconditional transmission operation to a dynamic grant. The dynamic grant is referred to as a grant that is allocated on PDCCH and is used once only for the first transmission. In the following description, the first information is expressed as SkipULTxDynamic.

The second information is referred to as information indicating a condition as to whether a conditional transmission operation is applied to a configured grant and is formed by 1 bit. When UE is signaled with 1 bit, the UE applies a conditional transmission operation to a configured grant. When UE is not signaled with 1 bit, the UE applies an unconditional transmission operation to a configured grant. The configured grant is referred to as a grant that SPS is applied to and that is, once it is allocated on PDCCH, used a number of times for the first transmission until it is released. In the following description, the second information is expressed as SkipULTxSPS.

When an uplink transmission resource allocated for new transmission is available in operation 1125, UE determines whether the uplink transmission is performed in operation 1130. The uplink transmission resource allocated for new transmission may be a transmission resource which is allocated via PDCCH addressed by a C-RNTI of UE or a transmission resource for SPS, i.e., configured UL grant.

UE: determines whether it performs the transmission via the uplink transmission resource (or whether the NDI related to the uplink transmission resource is toggled), considering a condition as to whether the first information is configured (exists), a condition as to whether the second information is configured (exists), a type of an available transmission resource, a condition as to whether uplink data to be transmitted exists, a characteristic of uplink data to be transmitted, etc.; and performs or does not perform the uplink transmission, based on the determination in operation 1130.

Figure 12:
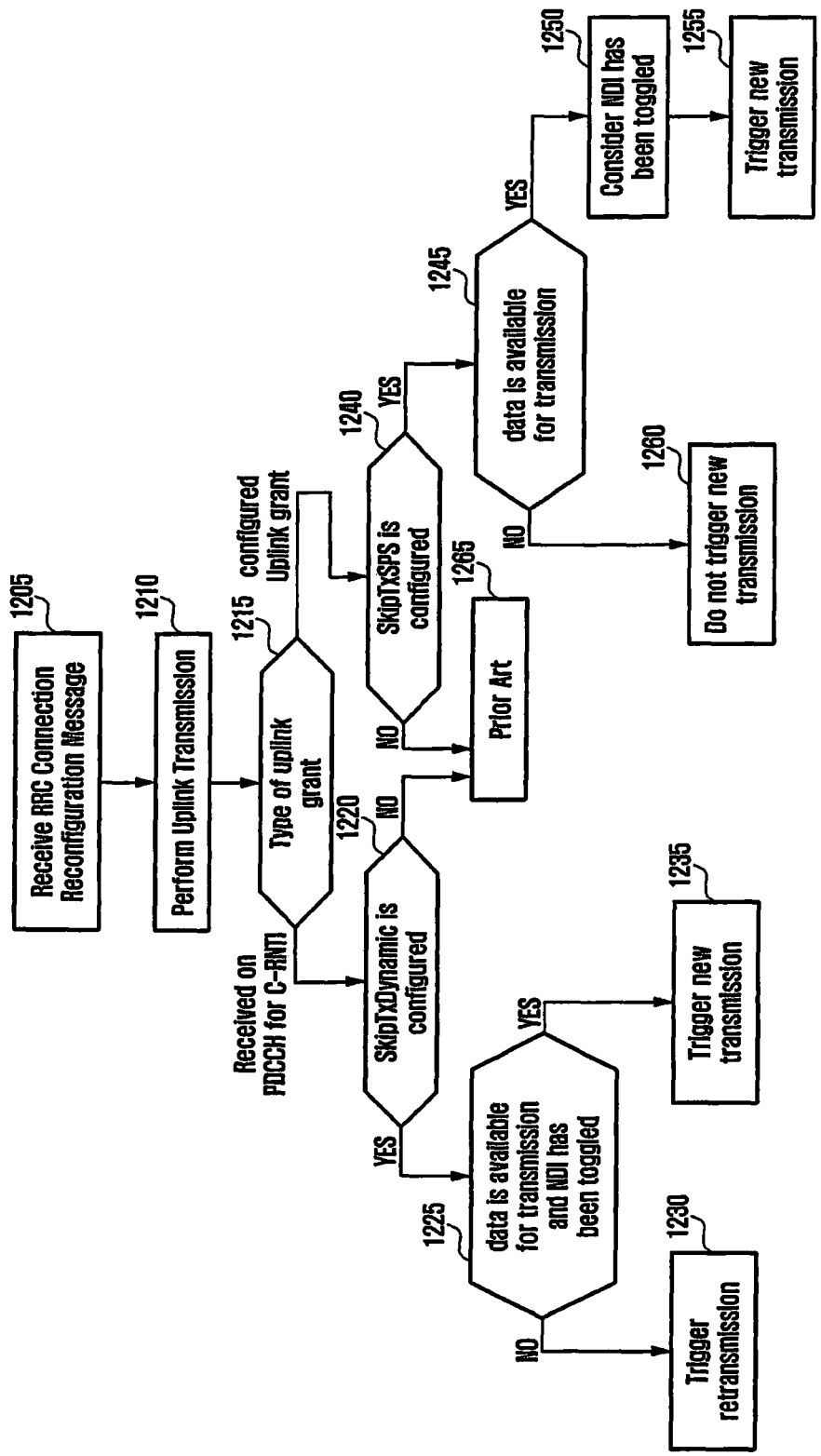
FIG. 12 is a flowchart that describes operations of UE according to Embodiment 2-2.

FIG. 12 is a flowchart that describes operations of UE.

UE receives an RRC connection re-configuration control message, RRCConnectionReconfiguration, in operation 1205. UE re-configures the RRC connection according to the received control message. For example, when the RRC connection re-configuration message comprises SPS configuration information, UE configures SPS and performs the SPS related operation. The control message may comprise information related to the conditional transmission described above.

When UE needs to perform the uplink transmission, e.g., when UE is instructed to perform the uplink transmission on PDCCH or when a time that a configured uplink grant is available is reached, in operation 1210, the UE determines whether the related uplink grant is a configured grant or a dynamic grant received on PDCCH in operation 1215. When the UE ascertains that the related uplink grant is a dynamic grant received on PDCCH in operation 1215, it proceeds with operation 1220. When the UE ascertains that the related uplink grant is a configured grant in operation 1215, it proceeds with operation 1240.

UE determines whether SkipTxDynamic is configured in operation 1220. When UE ascertains that SkipTxDynamic is configured in operation 1220, it proceeds with operation 1225. When UE ascertains that SkipTxDynamic is not configured in operation 1220, it proceeds with operation 1265.

UE determines whether it satisfies the following condition in operation 1225. When UE satisfies the following condition in operation 1225, it proceeds with operation 1230. When UE does not satisfy the following condition in operation 1225, it proceeds with operation 1235.

<Condition>

Data available for transmission exists, and an NDI of the related HARQ process differs from the previous value (or is toggled).

The NDI is managed per HARQ process and controls the HARQ operation. An HARQ device determines whether an NDI is changed, and distinguishes between a new transmission and the re-transmission, based on the determination.

UE triggers the HARQ re-transmission in operation 1230. The triggered HARQ re-transmission is connected to the HARQ re-transmission at a timing.

UE triggers the first HARQ transmission in operation 1235. The triggered first HARQ transmission may be connected to the first HARQ transmission at a timing.

UE determines whether SkipTxSPS is configured in operation 1240. When SkipTxSPS is configured in operation 1240, UE proceeds with operation 1245. When SkipTxSPS is not configured in operation 1240, UE proceeds with operation 1265.

UE determines whether it satisfies the following condition in operation 1245. When UE satisfies the following condition in operation 1245, it proceeds with operation 1250. When UE does not satisfy the following condition in operation 1245, it proceeds with operation 1260.

<Condition>

Data available for transmission exists.

UE considers that an NDI of a corresponding HARQ process is toggled in operation 1250, and triggers the first transmission in operation 1255. That is, when data available for transmission exists, without considering an actual NDI for a configured transmission resource, UE considers that the NDI has been toggled and triggers a new transmission.

UE does not consider that an NDI has been toggled, and does not trigger new transmission in operation 1260. That is, in a state where SkipTxSPS has been configured, when data available for transmission does not exist despite of the presence of a configured uplink grant, UE does not consider that an NDI is toggled and does not trigger a new transmission.

UE operates in the same way as prior art in operation 1265. That is, UE performs the reverse transmission, according to an instructed reverse grant or configured reverse grant, regardless of the presence of data available for transmission.

In the embodiment of the present invention, when data available for transmission exists, it means that data available for transmission exists in a higher layer or MAC CE, except for truncated BSR or padding BSR, exists. The higher layer data available for transmission may be referred to as PDCP SDU, PDCP PDU, RLC SDU, and RLC PDU.

Embodiment 2-3

With the evolution of mobile communication systems, the minimization of the uplink delay has become as an important issue. The present invention provides a shared SPS scheme for reducing the uplink relay.

Most part of the uplink delay is caused in processes where UE requests the allocation of a transmission resource and the transmission resource is allocated. In a state where UE is successively allocated an SPS transmission resource, when data is created, the UE is capable of performing the rapid transmission of the data. However, when SPS transmission resources are dedicatedly allocated to all UE devices, the transmission resources are excessively consumed. In order to resolve the problem, various embodiments of the present invention introduce a shared SPS scheme that allocates the same SPS transmission resource to a number of UE devices. UE devices configured with shared SPS perform the transmission of data only when they have data to be transmitted. UE devices configured with shared SPS monitor PDCCH and apply different UE identifiers to the uplink scrambling, so that the ENB can identify uplink data from UE devices, respectively. Since the shared SPS scheme uses only a small part of the given resources, it is preferable that the scheme is applied to a small cell abundant in transmission resources.

Therefore, the shared SPS scheme is used for a serving cell specified by an ENB, unlike general SPS schemes.

Figure 13:
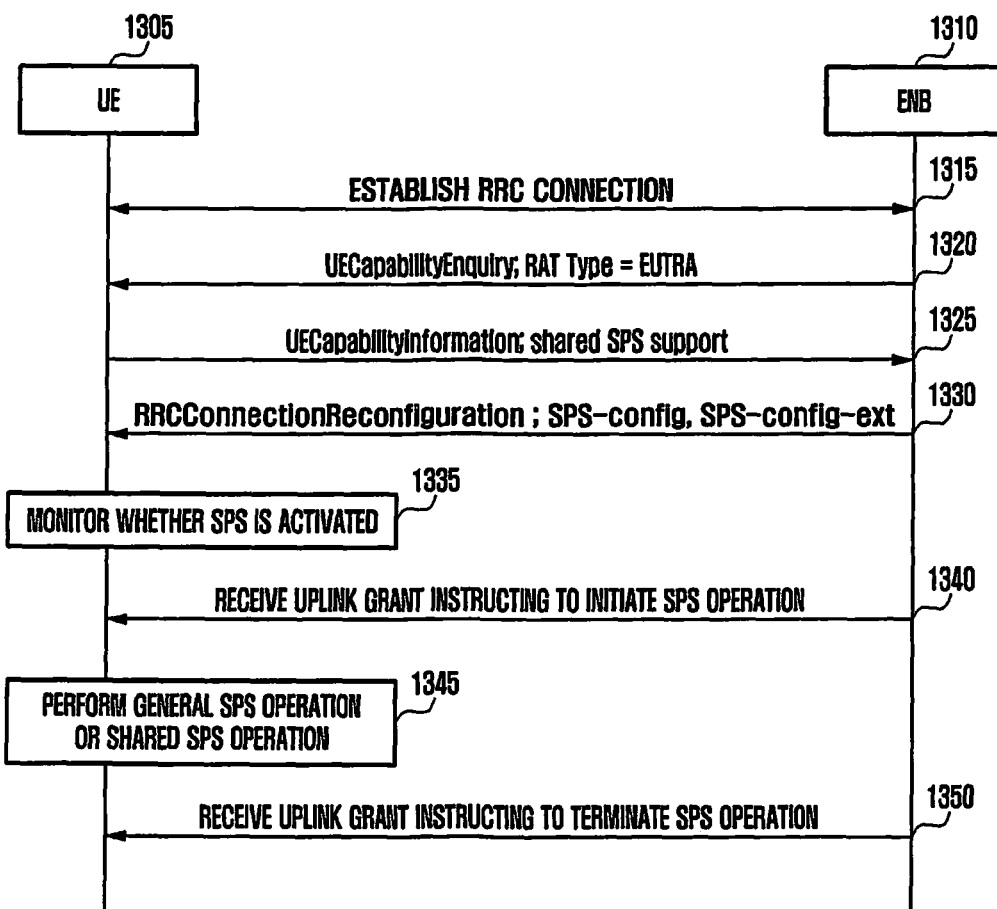
FIG. 13 is a flow diagram that describes the operations between UE and ENB according to Embodiment 2-3.

FIG. 13 is a flowchart that describes the operations between UE and ENB according to Embodiment 2-3.

In a mobile communication system includes UE 1305, an ENB 1310 and other nodes, the UE establishes the RRC connection with the ENB in operation 1315. Establishing the RRC connection between UE and ENB means that the ENB and UE configures a Signaling Radio Bearer (SRB) therebetween and thus exchange RRC control messages with each other. The RRC connection is established via a random access process in such a way that: UE transmits an RRC connection establishment request message to an ENB; the ENB transmits an RRC connection establishment message to the UE: and the UE transmits an RRC connection establishment complete message to the ENB.

After establishing the RRC connection, the ENB 1310 is capable of transmitting, to the UE 1305, a UECapabilityEnquiry control message instructing the UE 1305 to report the UE capability, if it is necessary, in operation 1520. The control message comprises the field of a Radio Access Technology (RAT) type, indicating a capability regarding an RAT, from among the capabilities of UE. When the ENB is reported a capability regarding EUTRA, the ENB sets the RAT Type to EUTRA.

When receiving the UECapabilityEnquiry control message where the RAT Type is set to EUTRA, UE 1305 transmits, to the ENB 1310, a UECapabilityInformation control message comprising the UE's capability information regarding EUTRA in operation 1325.

The control message comprises UE-EUTRA-Capability. The UE-EUTRA-Capability comprises a name list of features supported by UE, categories of UE (ue-Category), a combination of frequency bands supported by UE (supportedBandCombination), etc. UE supports a shared SPS function. When UE has completed the inter-Operability Test for the shared SPS function, it may include an IE representing that it can support the shared SPS function in the control message.

When the ENB 1310 ascertains that the latency reduction needs to be applied to the UE 1305, it is capable of instructing the UE 1305 to perform the RRC connection reconfiguration in operation 1330). The ENB is capable of transmitting the shared SPS configuration information to the UE, via the RRC connection reconfiguration message. The shared SPS configuration information is formed with SPS-Config information and SPS-Config-ext.

The structure of the SPS-Config may be identical to the SPS configuration information described above in the section of Embodiment 2-1.

The structure of the SPS-Config-ext is as follows.

```
SPS-Config-ext ::=                    SEQUENCE {
semiPersistSchedC-RNTI2 C-RNT OPTIONAL,
semiPersistSchedIntervalUL2           ENUMERATED {
sf1, sf2, sf4, sf6, sf8, spare3, spare2,
spare1},
logicalChannelIdList...
SharedSPSenabledCell                  ServCellIndex
}
...
```

In summary, SPS-Config may comprise the following IEs:
first SPS C-RNTI (semiPersistSchedC-RNTI)
first interval (semiPersistSchedIntervalUL)
automatic release parameter (semiPersistSchedC-RNTI)
For example, SPS-Config-ext may comprise the following IEs:
  Shared SPS indicator (SPS-Config-ext may serve as a shared SPS indicator or an additional indicator may be employed)
  second SPS C-RNTI (semiPersistSchedC-RNTI2)
  second interval (semiPersistSchedIntervalUL2)
  Logical channel list (logicalChannelIdList): a name list of logical channels capable of using a shared SPS
  serving cell id (SharedSPSenabledCell): an identifier of a serving cell where a shared SPS will be activated/employed UE 1305 monitors whether the SPS function is activated in operation 1335. UE 1305 monitors whether a general SPS and a shared SPS are activated, respectively.

Setting a general SPS function to a UE device means that: only SPS-config is set to UE at a corresponding timing but SPS-config-ext is not set thereto. This corresponds to the following cases: UE has received an rrcConnectionReconfiguration message comprising valid SPS-config from the ENB; UE has not released the received SPS-config; UE has not received the SPS-Config-ext; and UE received the SPS-Config-ext but has already released the SPS-Config-ext. For example, when UE, not set with an SPS, receives an rrcConnectionReconfiguration control message that comprises only SPS-config but does not comprise SPS-Config-ext, it is set with a general SPS.

Setting a shared SPS function to a UE device means that: SPS-config and SPS-config-ext are set to UE at a corresponding timing. This corresponds to the following cases: UE has received an rrcConnectionReconfiguration message comprising valid SPS-config and valid SPS-Config-ext from the ENB; and UE has not released the received SPS-config and the received SPS-Config-ext. For example, when UE, not set with an SPS, receives an rrcConnectionReconfiguration control message that comprises SPS-config and SPS-Config-ext, it is set with a shared SPS.

UE set with a general SPS monitors PDCCH of PCell or PSCell (hereafter commonly called SpCell) and determines whether SPS is activated. When UE receives an uplink grant, via a first SPS C-RNTI, on the PDCCH of SpCell, it checks a new data indicator (NDI) of the uplink grant. When the NDI is '0' and information regarding the PDCCH is not information specifying the release, UE stores the uplink grant and the associated HARQ information as configured uplink grant, and initiates the SPS operation.

Via a PDCCH of a serving cell specified as SharedSPSenabledCell or via a PDCCH of a scheduling cell of the serving cell (refer to the cell CrossCarrierSchedulingConfig which provides scheduling information regarding the serving cell) in a state where a cross-carrier scheduling is employed, when UE set with a shared SPS receives uplink grant, via an SPS C-RNTI for the monitoring, it checks an NDI of the uplink grant. When the NDI is '0' and information regarding the PDCCH is not information specifying the release, UE stores the uplink grant and the associated HARQ information as configured uplink grant, and initiates the shared SPS operation.

The SPS C-RNTI for the monitoring may be first SPS C-RNTI or second SPS C-RNTI.

In a general SPS operation, the SPS C-RNTI for monitoring an SPS activation signal is identical to the SPS C-RNTI for the scrambling on PUSCH. That is, UE monitors the PDCCH by using one SPS C-RNTI as a first SPS C-RNTI, and scrambles the uplink data.

In a shared SPS operation, an SPS C-RNTI for monitoring PDCCH and an SPS C-RNTI for scrambling the uplink data are separated from each other. For example, PDCCH is monitored by a first SPS-CRNTI and PUSCH is scrambled by a second SPS C-RNTI. Alternatively, PDCCH is monitored by a second SPS-CRNTI and PUSCH is scrambled by a first SPS C-RNTI. These operations are separately performed because an SPS C-RNTI for the monitoring is an identifier which is commonly applied to a number of UE devices, and thus an ENB cannot identify, when uplink data is scrambled with the SPS C-RNTI for the monitoring, UE transmitting the uplink data. Therefore, an SPS C-RNTI for the uplink scrambling employs a UE specific SPS C-RNTI. That is, an ENB allocates the same value to an SPS C-RNT for the monitoring for a number of UE devices in a shared SPS. On the other hand, the ENB allocates unique values to SPS C-RNTIs for the scrambling for UE devices, respectively.

Scrambling PUSCH by using an SPS C-RNTI is defined in the TS 36.212 and TS 36.213.

When UE receives an uplink grant instructing to initiate a general SPS operation or a shared SPS operation in operation 1340, it initiates a general SPS operation or a shared SPS operation in operation 1345.

In the following description, a general SPS operation is explained.

UE performs the uplink transmission, using an SPS resource, at a cycle of semiPersistSchedIntervalUL (a cycle included in the SPS-config) in SpCell, based on a sub-frame initiating an SPS operation. For example, UE ascertains that the Nth grant has been created in a sub-frame of an SpCell, and performs the uplink transmission by applying a corresponding grant to the sub-frame.

Although UE does not have data to be transmitted at a corresponding timing when transmitting an MAC PDU via the SPS resource, it creates and transmits a padding MAC PDU including BSR MAC CE and Padding MAC CE. The UE may apply a first SPS C-RNTI to the scrambling operation for the uplink transmission.

When only Zero MAC SDU MAC PDU is transmitted for a number of times, implicitReleaseAfter, UE releases the configured uplink grant.

In the following description, a shared SPS operation is explained.

UE performs the uplink transmission, using a shared SPS resource, at a cycle of semiPersistSchedIntervalUL2 (a cycle included in the SPS-config-ext) in the SharedSPSenabledCell, based on a sub-frame initiating an SPS operation. For example, UE ascertains that the Nth grant has been created in a sub-frame of an SpCell, and performs the uplink transmission by applying a corresponding grant to the sub-frame.

When UE does not have 'data available for transmission via a shared SPS transmission resource' at a corresponding timing that MAC PDU is transmitted via the SPS resource, it does not perform the uplink transmission. Although only Zero MAC SDU MAC PDU has been transmitted for a number of times, implicitReleaseAfter, UE does not release the configured uplink grant. The Zero MAC SDU MAC PDU is referred to as MAC PDU that comprises only MAC CE but does not comprise MAC SDU comprising high layer data. UE performs the scrambling for the uplink transmission by employing an SPS C-RNTI that differs from an SPS C-RNTI used to monitor PDCCH. The SPS C-RNTI applied to the scrambling may be a C-RNTI of the UE. That is, the identifier may be formed in various combinations as in the following Table 5.

TABLE 5

| Identifier for monitoring PDCCH | Identifier for scrambling uplink |
|---|---|
| semiPersistSchedC-RNTI of SPS-config | semiPersistSchedC-RNTI2 of SPS-config-ext |
| semiPersistSchedC-RNTI2 of SPS-config-ext | semiPersistSchedC-RNTI of SPS-config |
| semiPersistSchedC-RNTI of SPS-config | C-RNTI of mobilityControlInfo or C-RNTI allocated in the RRC connection configuration |

In table 5, the last row is a case where SPS C-RNTI 2 is not allocated in SPS-config-ext. In this case, UE scrambles the shared SPS uplink transmission, using its C-RNTI, i.e., its UE specific identifier.

As described above, UE is capable of transmitting only data of a logical channel, logicalChannelIdList, via a shared SPS transmission resource. Although UE has data of other logical channels (e.g., RRC messages, etc.), except for the data of the logicalChannel IdList, it does not consider the data to be 'data available for transmission via a shared SPS transmission resource' but considers only data of a logical channel of the logicalChannelIdList to be 'data available for transmission via a shared SPS transmission resource.'

When UE 1305 receives the uplink grant indicating the SPS release in operation 1350, it terminates the SPS operation and releases the configured uplink grant or the configured shared uplink grant.

Figure 14:
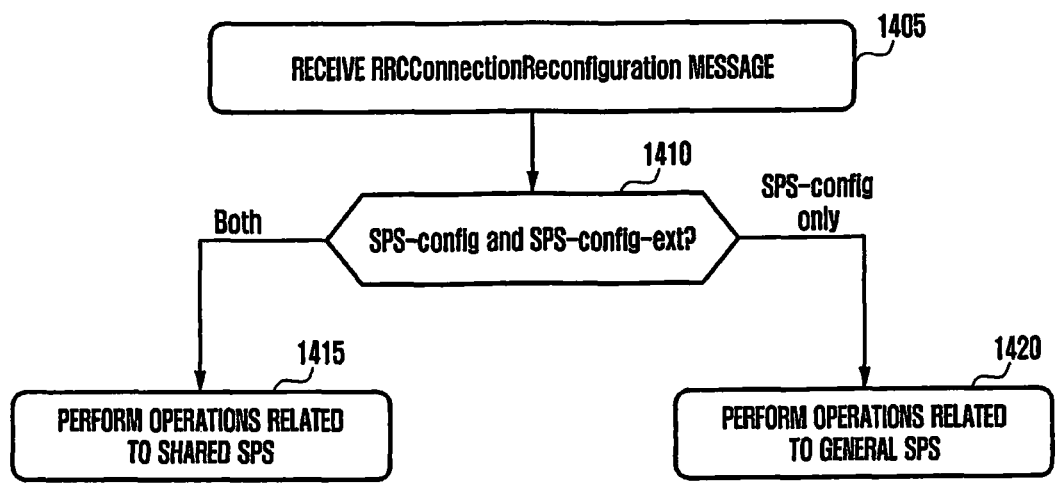
FIG. 14 is a flowchart that describes operations of UE according to Embodiment 2-3.

FIG. 14 is a flowchart that describes operations of UE according to Embodiment 2-3.

UE has not received valid SPS-config; or although UE received valid SPS-config, it has already released the SPS-config. This UE receives a control message, RRCConnectionReconfiguration, in operation 1405.

UE determines whether the control message comprises SPS-config and SPS-config-ext in operation 1410. When UE ascertains that the control message comprises both SPS-config and SPS-config-ext in operation 1410, it performs operations related to a shared SPS in operation 1415.

When UE ascertains that the control message comprises only SPS-config in operation 1410, it performs operations related to a general SPS in operation 1420.

The operations related to a shared SPS and operations related to a general SPS are described as in the following table 6.

TABLE 6

| Operations related to a general SPS | Operations related to a shared SPS |
|---|---|
| Monitor PDCCH of SpCell | Monitor PDCCH of SharedSPSenabledCell |
| Determine whether to receive an uplink grant instructing to initiate a general SPS operation by using semiPersistSchedC-RNTI allocated in SPS-config | Determine whether to receive an uplink grant instructing to initiate operations related to a shared SPS operation by using an identifier for monitoring PDCCH |
| Apply an SPS cycle to semiPersistSchedIntervalUL of SPS-config | Apply an SPS cycle to semiPersistSchedIntervalUL2 of SPS-config-ext |
| Scramble the transmission of PUSCH via an SPS resource, by using 'semiPersistSchedC-RNTI allocated in SPS-config' | Scramble the transmission of PUSCH via an SPS resource, by using an 'identifier for uplink scrambling' |

TABLE 6-continued

| Transmit uplink data via PUSCH of SpCell | Transmit uplink data via PUSCH of SharedSPSenabledCell |
|---|---|
| Transmit padding MAC PDU when there is no data available for transmission | Omit the transmission when there is no data available for transmission |
| Release an SPS transmission resource when 'Zero MAC SDU MAC PDU' is successively transmitted a preset number of times | Maintain an SPS transmission resource although 'Zero MAC SDU MAC PDU' is successively transmitted a preset number of times |

The following table 7 shows operations according to another embodiment.

TABLE 7

| Operations related to a general SPS | Operations related to a shared SPS |
|---|---|
| Monitor PDCCH of SpCell | Monitor PDCCH of SpCell |
| Monitor Dedicated Search Space of SpCell PDCCH | Monitor Common Search Space of SpCell PDCCH |
| Determine whether to receive uplink grant instructing to initiate a general SPS operation by using semiPersistSchedC-RNTI allocated in SPS-config | Determine whether to receive uplink grant instructing to initiate operations related to a shared SPS operation by using an identifier for monitoring PDCCH |

The common search space and dedicated search space follow TS 36.211, 36.212, and 36.213.

Figure 15:
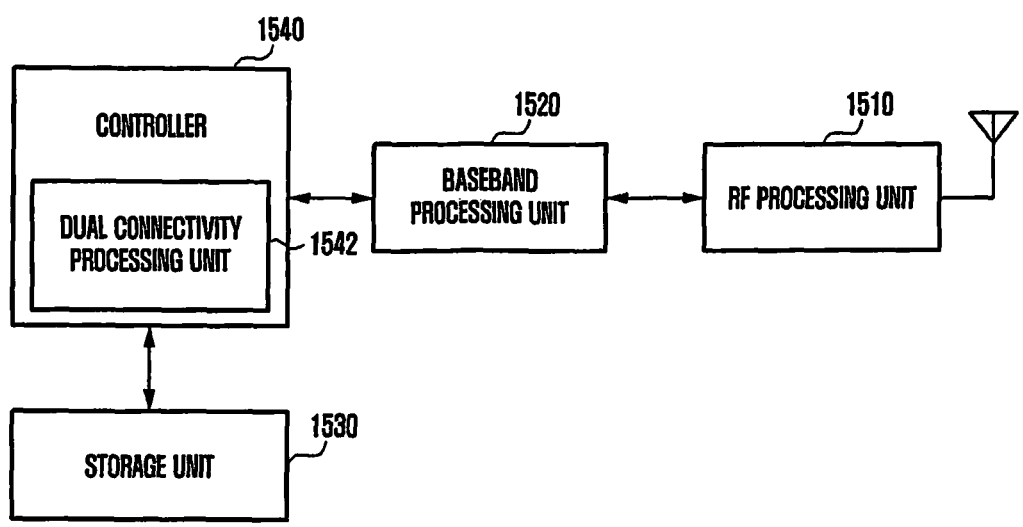
FIG. 15 is a block diagram showing of the configuration of UE in a wireless communication system according to Embodiment 2.

FIG. 15 is a block diagram showing of the configuration of UE according to Embodiment 2 of the present invention.

With reference to FIG. 15, the UE includes a Radio Frequency (RF) processing unit 1510, a baseband processing unit 1520, a storage unit 1530, and a controller 1540.

The RF processing unit 1510 performs functions relates to the transmission/reception of signals via a wireless channel, e.g., the conversion of frequency band, the amplification, etc. The RF processing unit 1510 up-converts baseband signals output from the baseband processing unit 1520 into RF band signals and transmits the RF signals via an antenna. The RF processing unit 1510 down-converts RF band signals received via the antenna into baseband signals. The RF processing unit 1510 is capable of including a transmission filter, a reception filter, an amplifier, a mixer, an oscillator, a digital to analog convertor (DAC), an analog to digital convertor (ADC), etc. Although the embodiment is shown in FIG. 15 so that the UE includes only one antenna, it should be understood that the UE may be implemented to include a number of antennas. The RF processing unit 1510 may also be implemented to include a number of RF chains. The RF processing unit 1510 is capable of performing a beamforming operation. In order to perform a beamforming function, the RF processing unit 1510 is capable of adjusting the phase and amplitude of individual signals transmitted/received via a number of antennas or antenna elements. The RF processing unit 1510 is capable of performing MIMO and receiving a number of layers in MIMO.

The baseband processing unit 1520 performs the conversion between baseband signals and bitstream according to a physical layer specification (rule) of the system. For example, in the data transmission, the baseband processing unit 1520 encodes and modulates a transmission bitstream, thereby creating complex symbols. In the data reception, the baseband processing unit 1520 demodulates and decodes baseband signals output from the RF processing unit 1510, thereby restoring a reception bitstream. For example, in the data transmission according to the orthogonal frequency division multiplexing (OFDM), the baseband processing unit 1520 encodes and modulates a transmission bitstream to create complex symbols, maps the complex symbols to sub-carriers, and configures OFDM symbols through the inverse fast Fourier transform (IFFT) operation and the cyclic prefix (CP) insertion. In the data reception, the baseband processing unit 1520 splits baseband signals output from the RF processing unit 1510 into OFDM symbol units, restores signals mapped to sub-carriers through the fast Fourier transform (FFT) operation, and then restores a reception bitstream through the demodulation and decoding operation.

The baseband processing unit 1520 and the RF processing unit 1510 perform the transmission and reception of signals as described above. Therefore, the baseband processing unit 1520 and the RF processing unit 1510 may also be called a transmitter, a receiver, a transceiver, a communication unit, etc. In addition, the baseband processing unit 1520 and/or the RF processing unit 1510 may include a number of communication modules to support wireless access technologies that differ from each other. Alternatively, the baseband processing unit 1520 and/or the RF processing unit 1510 may include different communication modules to process signals of different frequency bands. Examples of the wireless access technologies include wireless LAN (e.g., IEEE 802.11), a cellular network (e.g., LTE), etc. Examples of the different frequency bands include super high frequency (SHF) (e.g., 2.5 GHz band, 5 GHz band, etc.), millimeter wave (mmW) (e.g., 60 GHz band), etc.

The storage unit 1530 stores a default program for operating the UE, applications, settings, data, etc. In particular, the storage unit 1530 is capable of storing information related to a second access node which performs wireless communication using a second wireless access technology. The storage unit 1530 provides the stored data according to the request of the controller 1540.

The controller 1540 controls all the operations of the UE. For example, the controller 1540 controls the baseband processing unit 1520 and the RF processing unit 1510 to perform the transmission/reception of signals. The controller 1540 controls the storage unit 1540 to store/read data therein/therefrom. To this end, the controller 1540 is capable of including at least one processor. For example, the controller 1540 is capable of including a communication processor (CP) for controlling the communication and an application processor (AP) for controlling higher layers such as applications. According to various embodiments of the present invention, the controller 1540 is capable of controlling the UE to perform the functions and the procedures described above referring to FIGS. 9 to 14.

Figure 16:
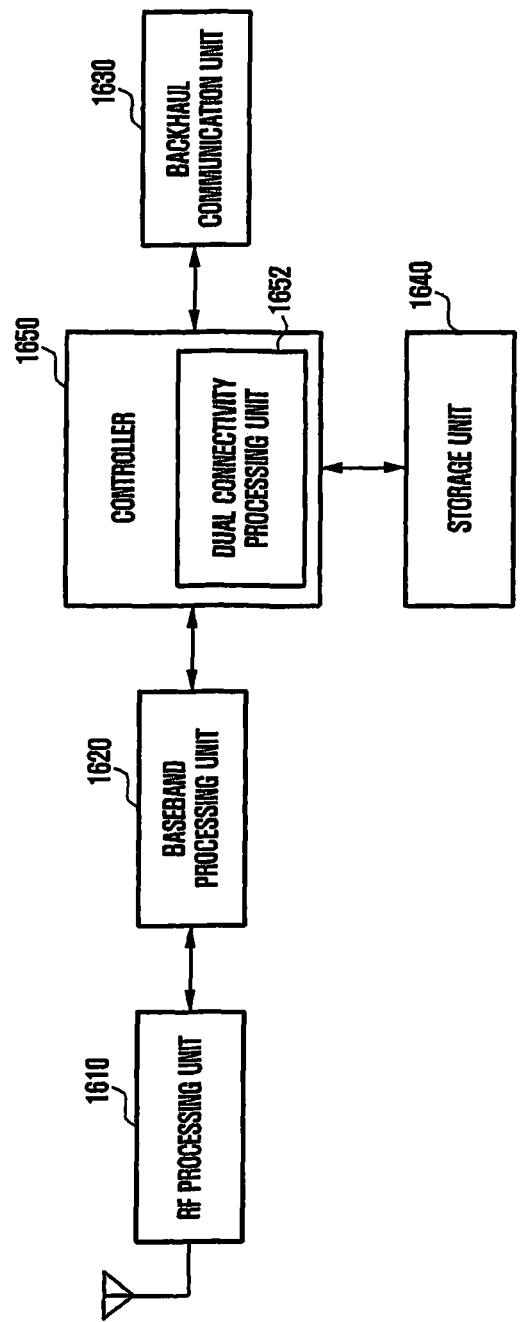
FIG. 16 is a block diagram showing the configuration of an ENB in a wireless communication system according to Embodiment 2.

FIG. 16 is a block diagram showing an ENB included in a wireless communication system according to Embodiment 2 of the present invention.

As shown in FIG. 16, the ENB includes an RF processing unit 1610, a baseband processing unit 1620, a backhaul communication unit 1630, a storage unit 1640, and a controller 1650.

The RF processing unit 1610 performs functions related to the transmission/reception of signals via a wireless channel, e.g., the conversion of frequency band, the amplification, etc. The RF processing unit 1610 up-converts baseband signals output from the baseband processing unit 1620 into RF band signals and transmits the RF signals via an antenna. The RF processing unit 1610 down-converts RF band signals received via the antenna into baseband signals. The RF processing unit 1610 is capable of including a transmission filter, a reception filter, an amplifier, a mixer, an oscillator, a DAC, an ADC, etc. Although the embodiment is shown in FIG. 16 so that the RF processing unit 1610 includes only one antenna, it should be understood that the RF processing unit 1610 may be modified to include a number of antennas. The RF processing unit 1610 may also be implemented to include a number of RF chains. The RF processing unit 1610 is capable of performing a beamforming operation. In order to perform a beamforming function, the RF processing unit 1610 is capable of adjusting the phase and amplitude of individual signals transmitted/received via a number of antennas or antenna elements. The RF processing unit 1610 is capable of transmitting one or more layers, thereby performing the downlink MIMO function.

The baseband processing unit 1620 performs the conversion between baseband signals and bitstream according to a physical layer specification (rule) of a first wireless access technology. For example, in the data transmission, the baseband processing unit 1620 encodes and modulates a transmission bitstream, thereby creating complex symbols. In the data reception, the baseband processing unit 1620 demodulates and decodes baseband signals output from the RF processing unit 1610, thereby restoring a reception bitstream. For example, in the data transmission according to the orthogonal frequency division multiplexing (OFDM), the baseband processing unit 1620 encodes and modulates a transmission bitstream to create complex symbols, maps the complex symbols to sub-carriers, and configures OFDM symbols through the inverse fast Fourier transform (IFFT) operation and the cyclic prefix (CP) insertion. In the data reception, the baseband processing unit 1620 splits baseband signals output from the RF processing unit 1610 into OFDM symbol units, restores signals mapped to sub-carriers through the fast Fourier transform (FFT) operation, and then restores a reception bitstream through the demodulation and decoding operation. The baseband processing unit 1620 and the RF processing unit 1610 perform the transmission and reception of signals as described above. Therefore, the baseband processing unit 1620 and the RF processing unit 1610 may also be called a transmitter, a receiver, a transceiver, a communication unit, a wireless communication unit, etc.

The backhaul communication unit 1630 provides interfaces to communicate with other nodes in the network. That is, the backhaul communication unit 1630 converts: a bitstream into a physical signal to be transmitted to other nodes of the primary ENB, e.g., an auxiliary ENB, a core network, etc.; and a physical signal from the other nodes into a bitstream.

The storage unit 1640 stores a default program for operating the primary ENB, applications, settings, data, etc. In particular, the storage unit 1640 is capable of storing information regarding a bearer allocated to the connected UE, a measurement result reported from the connected UE, etc. The storage unit 1640 is capable of providing the dual connectivity function to UE or storing reference information to determine whether the ENB terminates the dual connectivity operation. The storage unit 1640 provides the stored data according to the request of the controller 1650.

The controller 1650 controls all the operations of the primary ENB. For example, the controller 1650 controls the baseband processing unit 1620, the RF processing unit 1610 and the backhaul communication unit 1630 to perform the transmission/reception of signals. The controller 1650 controls the storage unit 1640 to store/read data therein/therefrom. To this end, the controller 1650 is capable of including at least one processor. The controller 1650 is capable of including a dual connectivity controller 1652 which provides UE with a dual connectivity function. For example, the controller 1650 is capable of controlling the primary ENB to perform the functions and procedure described above referring to FIGS. 9, 11 and 13.

Embodiment 3

The present invention relates to a method and apparatus for performing Scheduling Request (SR) in a plurality cells with PUCCH in an LTE mobile communication system.

FIG. 7 is a diagram illustrating LTE system architecture to which the present invention is applied.

Referring to FIG. 7, a radio access network of an LTE system includes evolved Node Bs (eNBs) 705, 710, 715, and 720, a Mobility Management Entity (MME) 725, and a Serving-Gateway (S-GW) 730. A User Equipment (hereinafter, referred to as UE or terminal) 735 connects to an external network via the eNBs 705, 710, 715, and 720 and the S-GW 730.

In FIG. 7, the eNBs 705, 710, 715, and 720 correspond to legacy node Bs of a Universal Mobile Telecommunications System (UMTS). The eNBs 705, 710, 715, and 720 allow the UE 735 to establish a radio channel and are responsible for functions more complicated as compared to the legacy node B. In the LTE system, since all the user traffic services including real time services such as Voice over Internet Protocol (VoIP) are provided through a shared channel, there is a need of a device to schedule data based on the state information (such as buffer status, power headroom status, and channel condition of the UE), and the eNBs 705, 710, 715, and 720 are responsible for such functions. Typically, one eNB controls a plurality of cells. In order to secure a data rate of up to 100 Mbps, the LTE system adopts Orthogonal Frequency Division Multiplexing (OFDM) as a radio access technology in up to 20 MHz bandwidth. Also, the LTE system adopts Adaptive Modulation and Coding (AMC) to determine the modulation scheme and channel coding rate in adaptation to the channel condition of the UE. The S-GW 730 is an entity to provide data bearers so as to establish and release data bearers under the control of the MME 725. The MME 725 is responsible for mobility management of UEs and various control functions and may be connected to a plurality of eNBs.

FIG. 8 is a diagram illustrating a radio protocol stack of an LTE system to which the present invention is applied. The LTE radio protocol stack for the UE and eNB consists of Packet Data Convergence Protocol (PDCP) 805 (1840), Radio Link Control (RLC) 810 (835), Medium Access Control (MAC) 815 (830), and Physical (PHY) 820 (825). The PDCP 805 (840) is responsible for IP header compression/decompression, and the RLC 810 (835) is responsible for segmenting the PDCP Protocol Data Unit (PDU) into segments suitable in size for Automatic Repeat Request (ARQ) operation. The MAC 815 (830) is responsible for establishing connections to a plurality of RLC entities to multiplex the RLC PDUs into MAC PDUs and demultiplex the MAC PDUs into RLC PDUs. The PHY 820 (825) performs channel coding on the MAC PDU and modulates the MAC PDU into OFDM symbols to transmit over radio channel or performs demodulation and channel-decoding on the received OFDM symbols and delivers the decoded data to the higher layers.

Figure 17:
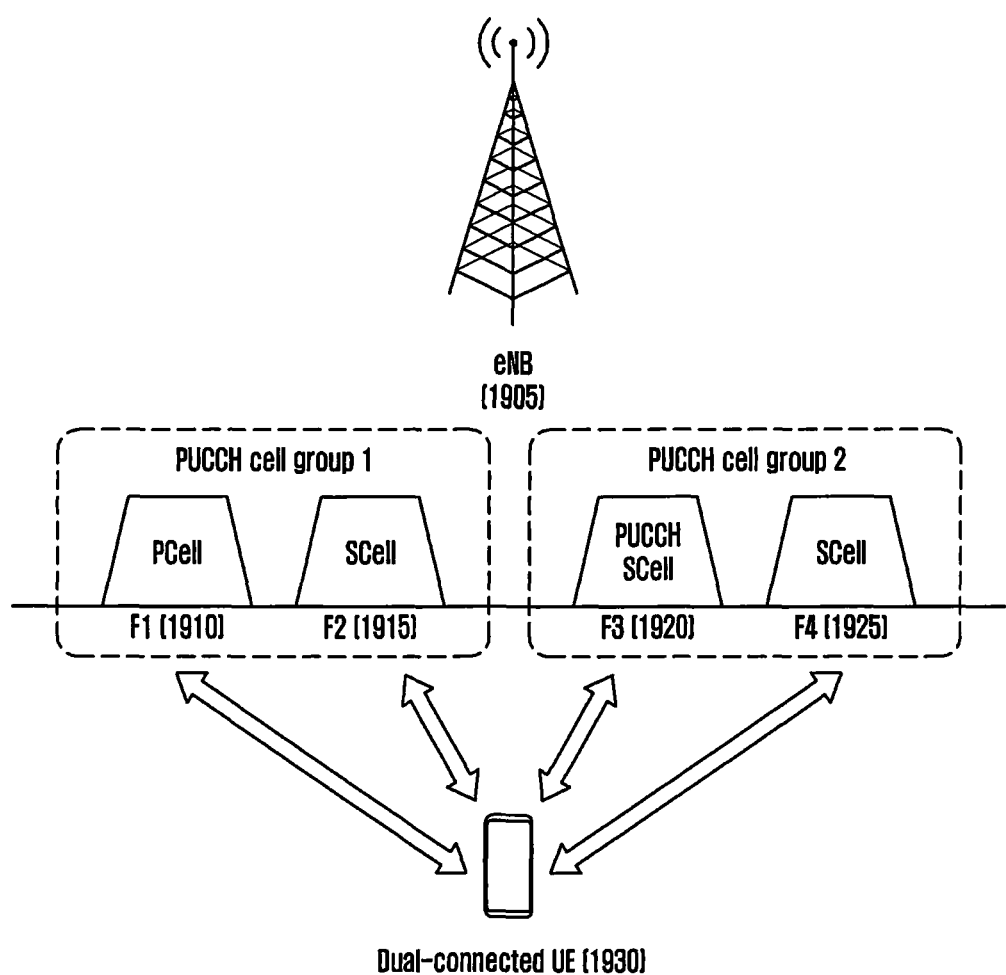
FIG. 17 is a diagram for explaining the enhanced carrier aggregation of a UE.

FIG. 17 is a diagram for explaining the enhanced carrier aggregation of a UE. Referring to FIG. 17, an eNB transmit/receive signals over a plurality of carriers in several frequency bands. For example, when the eNB 1905 transmits the signals over the uplink carriers of four cells, a terminal transmits/receives data through one of the cells in the legacy system. However, a UE having the carrier aggregation capability can transmit/receive data over several carriers simultaneously. The eNB 1905 may allocate more carriers to the UE 1930 having the carrier aggregation capability depending on the situation. If it is assumed that a cell is formed by one downlink carrier and one uplink carrier of an eNB in the conventional concept, the carrier aggregation may be understood as a UE transmits/receives data through multiple cells simultaneously. In this case, the peak data rate increases in proportion to the number of aggregated carriers. The LTE Rel-10 carrier aggregation technique is capable of configuring up to 5 cells to one UE. One of the configured cells has to have PUCCH inevitably and this cell is referred Primary Cell (PCell) 1910 while the rest cells having no PUCCH are referred to as Secondary Cell (SCell) 1915, 1925. The PCell is characterized by the functions of a legacy serving cell such as handover and RLF procedures as well as by PUCCH. In the following description, if the UE receives data over a certain downlink carrier and transmits data over a certain uplink carrier, this means that the UE transmits/receives data using the control and data channels provided in the cell corresponding to a center frequency and frequency band defining the carrier. Although the embodiments of the present invention are to a LTE system for explanation convenience, the present invention can be applied to various wireless communication systems supporting the carrier aggregation. In the Rel-carrier aggregation technology, only the PCell can have PUCCH. However, if the information amount to be transmitted to the eNB increases, it may be burdensome to process the corresponding information with a single PUCCH. Particularly in LTE Rel-13, discussion on the idea for supporting up to 32 carriers is underway, and if it is possible to configure PUCCH to a SCell as well as the PCell, this is advantageous in terms of PUCCH load distribution. There is therefore a proposal of introducing PUCCH to the SCell as well as the PCell. In the embodiment of FIG. 17, a PUCCH SCell 1920 is introduced additionally. In the present invention, the SCell having PUCCH is referred to as PUCCH SCell. In the legacy system, all PUCCH-related signals are transmitted to the eNB through the PCell. However, in the case that a plurality of PUCCHs exist, it is necessary to determine the PUCCH for transmitting SCell-specific PUCCH signals to the eNB. Since there are a plurality of PUCCHs, it is necessary to select a PUCCH for transmitting the SCell-specific PUCCH signals to the eNB. Assuming two PUCCHs as shown in FIG. 17, the cells may be sorted into a group of cells using the PUCCH of the PCell 1910 and a group of cells using the PUCCH of a certain SCell 1920. In the present invention, the groups are referred to as PUCCH cell groups.

Figure 18:
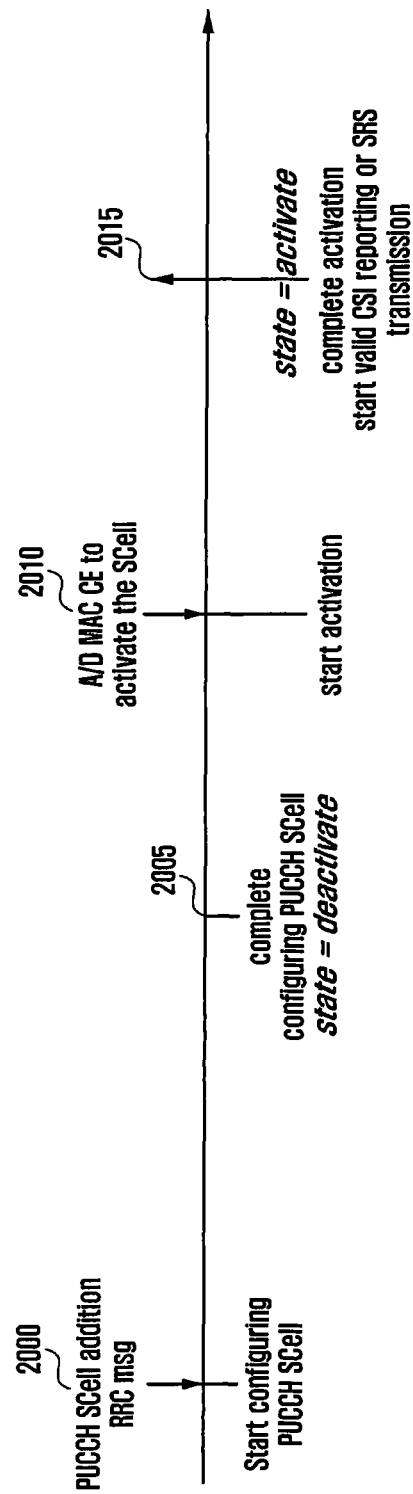
FIG. 18 is a diagram for explaining PUCCH SCell activation in accordance with the normal SCell activation procedure.

FIG. 18 is a diagram for explaining PUCCH SCell activation in accordance with the normal SCell activation procedure. A UE receives an RRC message indicative of adding a PUCCH SCell from an eNB as denoted by reference number 2000. At this time, the UE configures the PUCCH SCell. When the UE has completed configuration of the PUCCH SCell, the PUCCH SCell is in a deactivated state as denoted by reference number 2005. Afterward, if an Activation/Deactivation MAC CE is received from the eNB, the UE activates the PUCCH SCell as denoted by reference number 2010. At this time, the eNB may not transmit the Activation/Deactivation MAC CE to the UE right before completing the configuration. This is because the eNB does know the accurate time when the UE completes preparation for receiving the Activation/Deactivation MAC CE. By taking notice of this, the eNB is likely to transmit the Activation/Deactivation MAC CE to the UE after some marginal time. If the PUCCH SCell activation is completed, the UE reports a valid CSI for the SCell and transmits SRS as denoted by reference number 2015. Even after the activation has completed, the eNB does not know the accurate time when the UE starts transmitting the CSI report and SRS. Thus the eNB has to perform blind decoding until the above information are received. This increases the complexity of the eNB. If uplink synchronization is not achieved, the eNB transmits a PDCCH order to the UE to perform random access. In this case, the latency increases before the CSI report and SRS transmission.

Figure 19:
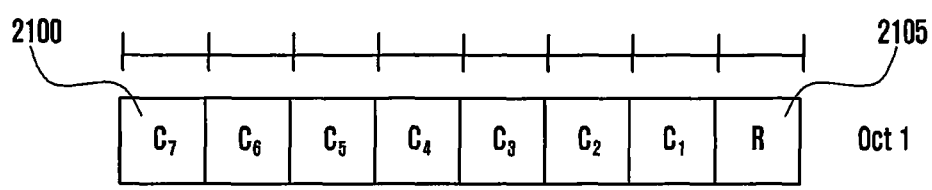
FIG. 19 shows a legacy Activation/Deactivation MAC Control Element (A/D MAC CE) format.

FIG. 19 shows a legacy Activation/Deactivation MAC Control Element (A/D MAC CE) format. The A/D MAC CE has a fixed length and consists of seven Ci fields 2100 and one Reserved (R) field 2105. The eNB transmits the A/D MAC CE to activate or deactivate the configured SCells. Each Ci field corresponds to the SCell indicated by SCellIndex i. Each Ci filed is set to 1 for activation of the corresponding SCell or to 0 for deactivation of the corresponding SCell.

FIG. 20 is a diagram illustrating an extended A/D MAC CE for supporting up to 32 serving cells. Since the legacy A/D MAC CE format has 7 Ci fields, it is possible to support up to 7 serving cells. If the number of serving cells increases up to 32, the legacy A/D MAC CE cannot indicate all the states of the serving cells. Thus, a new A/D MAC CE is defined to have the size of 4 bytes. Since the PCell is always in the activated state, it is ruled out in the A/D MAC CE. Accordingly, it is enough to indicate the activated/deactivated states of total 31 serving cells. Depending on the position of the R bit, A/D MAC CE format varies. Parts (a) and (b) of FIG. 20 show examples of the extended A/D MAC CE. If the first byte is designed to be identical with the legacy A/D MAC CE, the extended A/D MAC CE is formed as shown in part (a) of FIG. 20. Otherwise, if the R bit is arranged in the last byte, the extended A/D MAC CE is formed as shown in part (b) (605) of FIG. 20. In the present invention, the description is made based on part (a) (600) of FIG. 20. Each Ci field corresponds to a SCell. Each Ci field also corresponds to the SCell indicated by the SCellIndex i.

The extended A/D MAC CE is 4 times longer than the legacy A/D MAC CE so as to make it possible for the UE to have a capability of supporting up to 32 serving cells, but it is not preferred to always use the extended A/D MAC CE from the viewpoint of signaling overhead. Thus the present invention is characterized by determining whether to use the extended A/D MAC CE depending on the number of configured SCells. The SCells may be sorted into several types. Examples of the SCell types include a normal SCell, a PUCCH SCell capable of transmitting PUCCH, an LAA SCell using an unlicensed frequency band (ISM band), and Wi-Fi SCell used in the LTE-Wi-Fi integration technology. In the present invention, it is assumed that the activation/deactivation operation is not applied to the Wi-Fi SCell.

Figure 21:
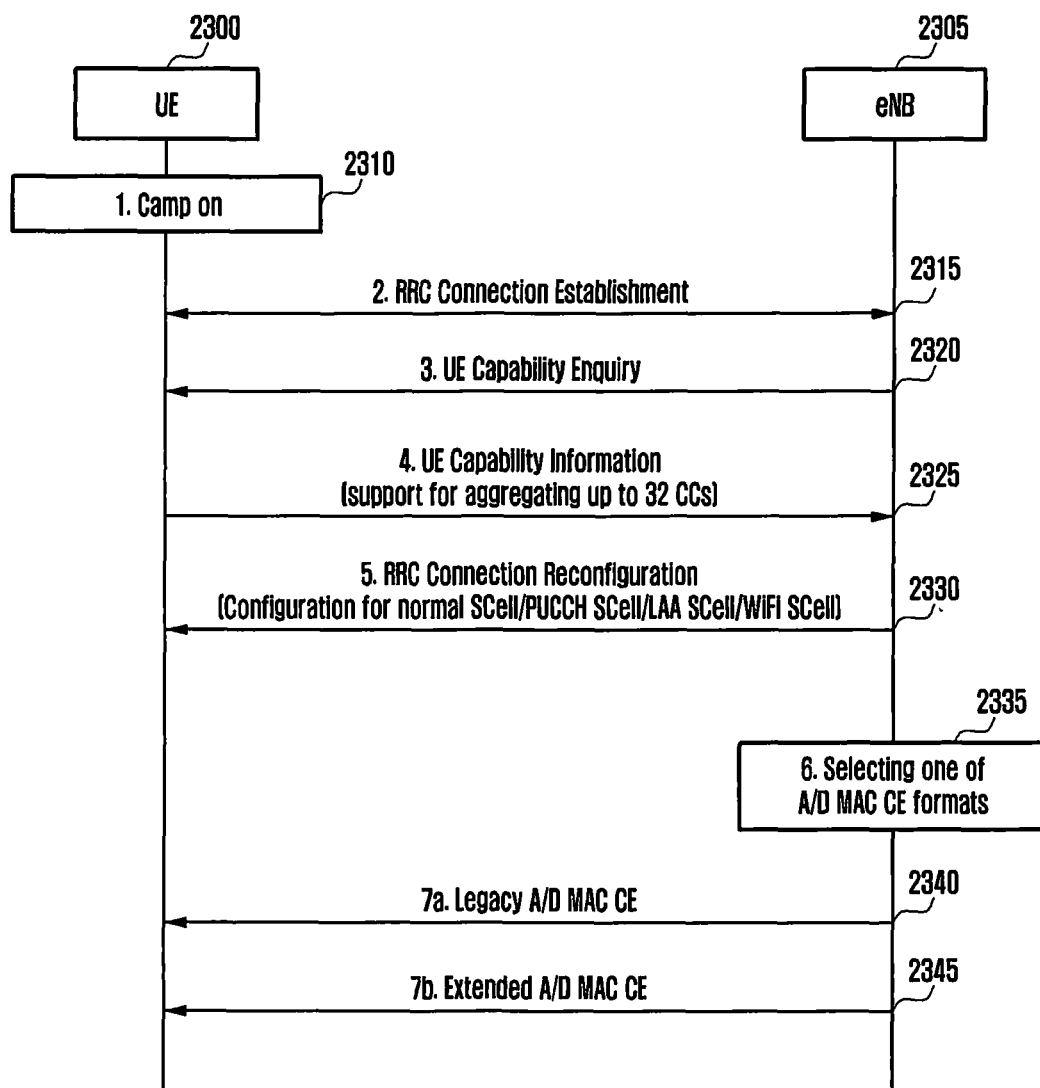
FIG. 21 is a signal flow diagram illustrating a method of selecting one of the legacy and extended A/D MAC CEs according to the present invention.

FIG. 21 is a signal flow diagram illustrating a method of selecting one of the legacy and extended A/D MAC CEs according to the present invention. A UE 2300 camps on a serving cell at step 2310. The UE performs an RRC Connection Establishment procedure with an eNB 2305 for data communication at step 2315. The eNB requests UE capability information at step 2320. The UE sends the eNB its capability information at step 2325. The capability information includes the information on whether it is possible to support up to 32 serving cells which is more than 5 serving cells as in the legacy system. The capability information may also include the information on whether LLA and LTE-Wi-Fi integration are supported. If the UE capability information is acquired, the eNB reconfigures the UE based on this information at step 2330. The reconfiguration information may include the information related to the configuration of normal SCell, PUCCH SCell, LLA SCell, and Wi-Fi SCell. If the RRC Connection Reconfiguration message including the configuration information is received, the UE checks the information related to the configurations of various SCells. If the message includes the configuration information of those SCells, the UE configures the normal SCell, PUCCH SCell and LLA SCell and regards that the configured SCells are in the deactivated state. In the case of the Wi-Fi SCell, however, if an association/authentication procedure is completed and then the UE regards that the SCell is in the activated state. The eNB determines an A/D MAC CE formation for use in activating or deactivating at least one SCell according to predetermined rules at step 2335. These rules include:

First rule: If the number of SCells, with the exception of the Wi-Fi SCell, is equal to or less than 7, then the legacy A/D MAC CE format is used. Otherwise, if the number of SCells is greater than 7, the extended A/D MAC CE format is used.

Second rule: If the highest value of the SCellIndex of the SCells, with the exception of the Wi-Fi SCell, is equal to or less than 7, the legacy A/D MAC CE format is used. Otherwise, if the highest value is greater than 7, the extended A/D MAC CE format is used, and at least one of the two rules is applied.

The two A/D MAC CE formats may use the same LCID or different LCIDs. In the case of using the same LCID, the UE may check the type of the A/D MAC CE formation to be received in advance based on the number of SCells configured to itself and the types of the SCells. In the case of using different LCIDs, the UE may check whether the legacy A/D MAC CE or the extended A/D MAC CE is used based on the LCID explicitly. Using these rules, the eNB selects one of the A/D MAC CE formats and sends the UE the A/D MAC CE in the selected format at step 2340 or 2345.

Figure 22:
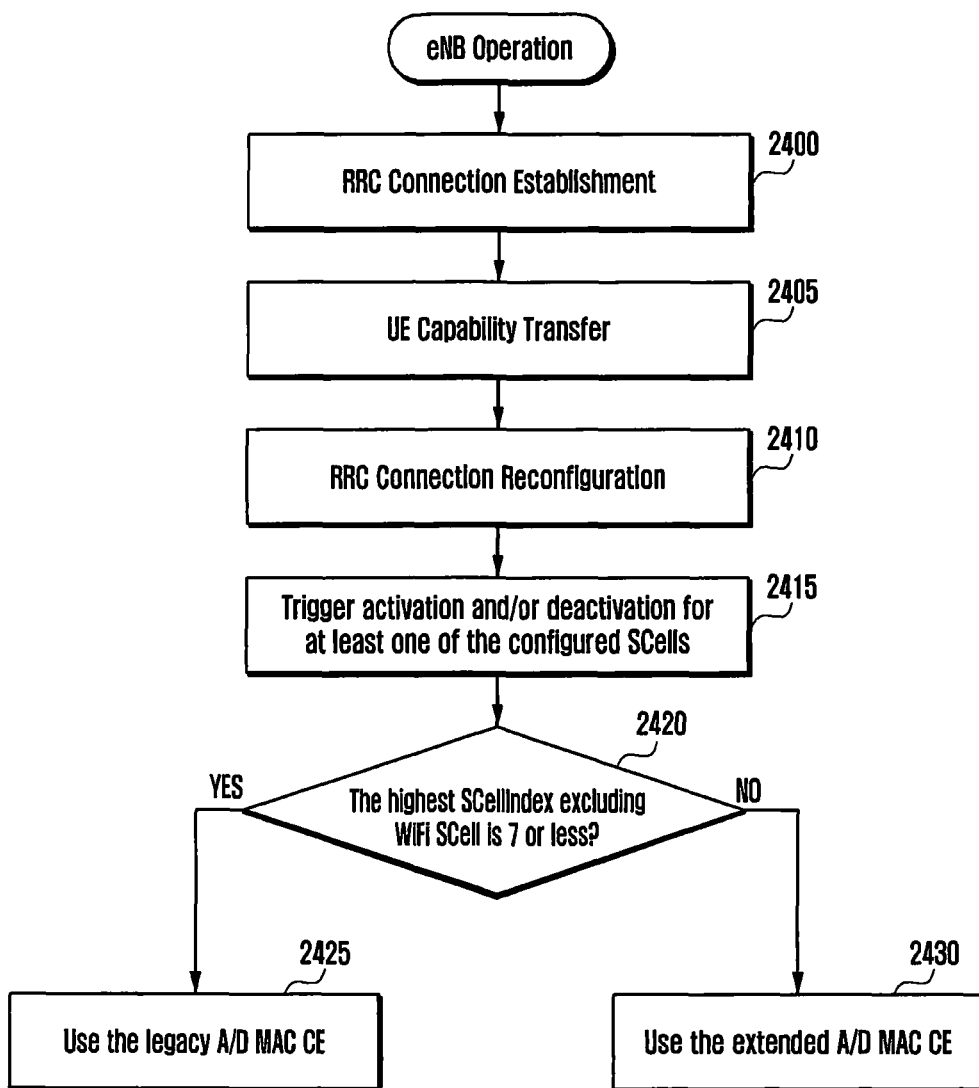
FIG. 22 is a flowchart illustrating an eNB operation according to the present invention.

FIG. 22 is a flowchart illustrating an eNB operation according to the present invention. The eNB performs an RRC Connection Establishment procedure with a UE for data communication at step 2400. The eNB receives UE capability information from the UE at step 2405. The eNB sends the UE an RRC Connection Reconfiguration message for reconfiguration at step 2410. The RRC message may include information necessary for configuring a plurality of SCells. The configuration information may include information related to configuration of normal SCell, PUCCH SCell, LAA SCell, and Wi-Fi SCell. The eNB triggers activation or deactivation of at least one of the SCells configured to the UE at step 2415. The eNB determines whether to use the legacy A/D MAC CE or the extended A/D MAC CE according to predetermined rules at step 2420. For example, if the highest value of the SCellIndex of the SCells, with the exception of the Wi-Fi SCell, is equal to or less than 7, the eNB determines to use the legacy A/D MAC CE format at step 2425. Otherwise, if the highest value is greater than 7, the eNB determines to use the extended A/D MAC CE format at step 2430.

Figure 23:
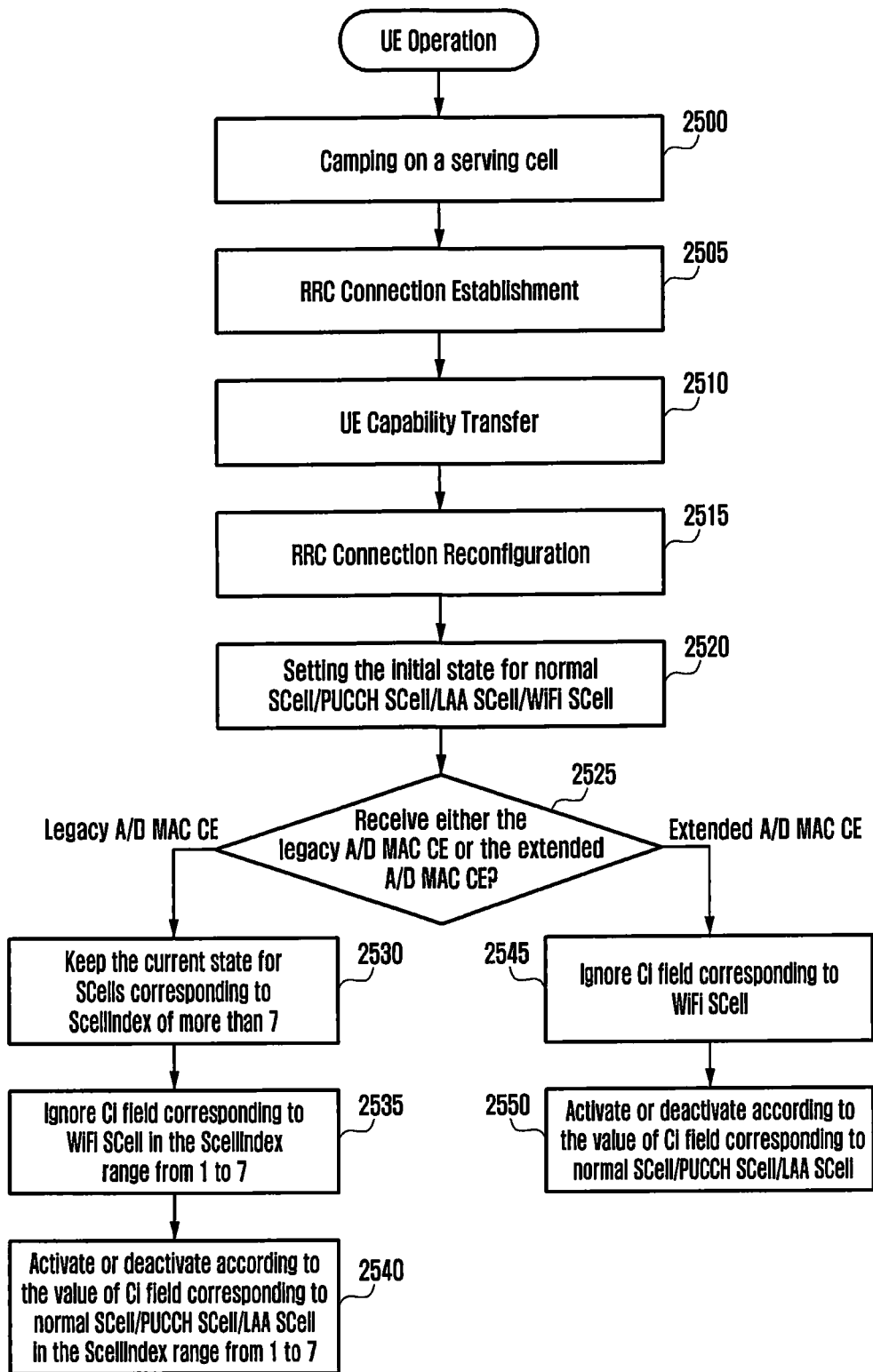
FIG. 23 is a flowchart illustrating a UE operation according to the present invention.

FIG. 23 is a flowchart illustrating a UE operation according to the present invention. A UE camps on a serving cell at step 2500. The UE performs an RRC Connection Establishment procedure with an eNB for data communication at step 2505. The UE sends UE capability information to the eNB at step 2510. The UE receives an RRC Connection Reconfiguration message from the eNB at step 2515. The RRC message may include the information necessary for configuring a plurality of SCells to the UE. The configuration information includes information related to the configuration of normal SCell, PUCCH SCell, LAA SCell, and Wi-Fi SCell. The UE checks the received configuration information to configure the normal SCell, PUCCH SCell, and LLA SCell and then regards that the cells are in the deactivated state at step 2520. In the case of the Wi-Fi SCell, the UE assumes that the Wi-Fi SCell is in the activated state after the association/authentication has been completed. The UE receives the A/D MAC CE indicative of activation or deactivation of at least one of the SCells configured to the UE and determines whether the A/D MAC CE is the legacy MAC CE or the extended MAC CE at step 2525. If the legacy A/D MAC CE is received, the UE keeps the current states (activated or deactivated) for the SCells corresponding to the SCellIndex values greater than 7 at step 2530. The UE ignores the Ci fields corresponding to the Wi-Fi SCells among the SCells corresponding to the SCell Index values in the range between 1 and 7 and keeps the current state for the Wi-Fi SCells at step 2535. The UE activates or deactivates the normal SCells, PUCCH SCells, and LAA SCells corresponding to the ScellIndex values in the range between 1 and 7 according to the corresponding Ci fields. If the extended A/D MAC CE is received, the UE ignores the Ci fields corresponding to the Wi-Fi SCells and keeps the current state thereof at step 2545. The UE activates or deactivates the normal SCells, PUCCH SCells, and LAA SCells according to the values of Ci fields corresponding thereto at step 2550.

Figure 24:
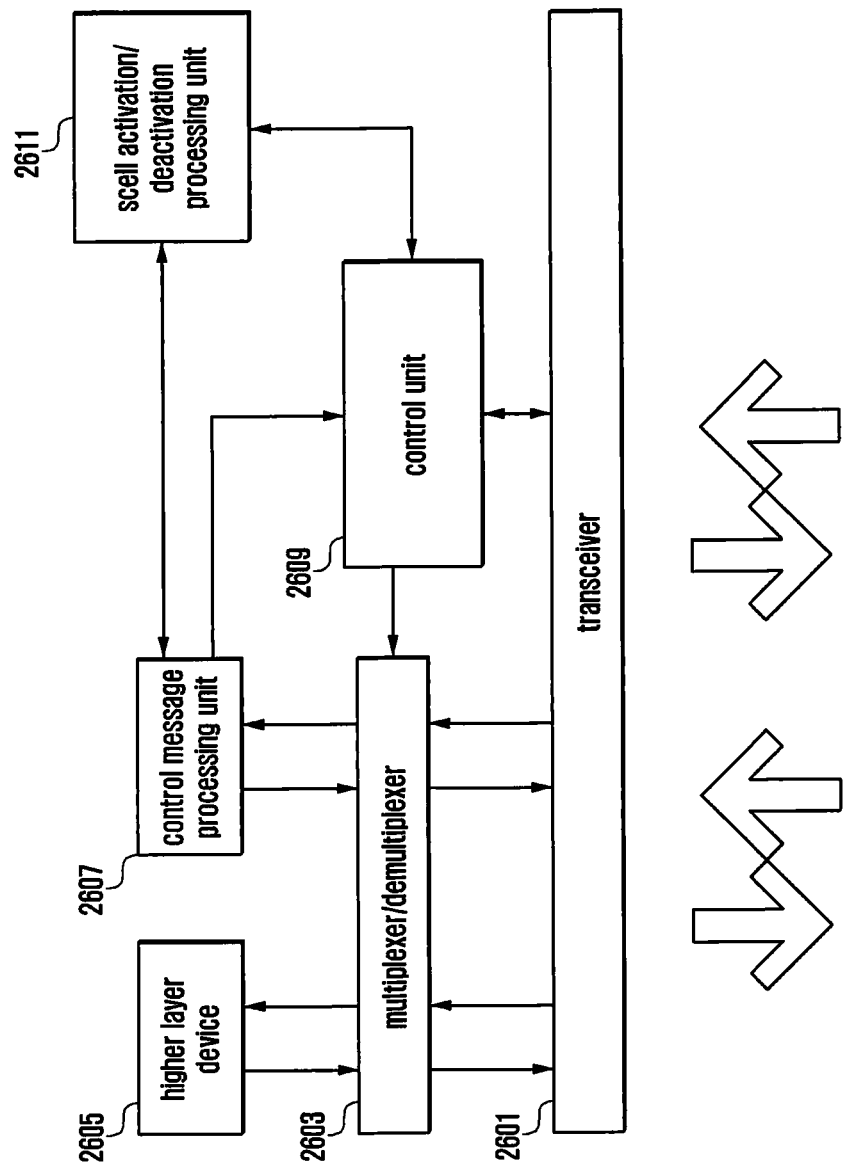
FIG. 24 is a block diagram illustrating a UE according to the present invention.

FIG. 24 is a block diagram illustrating a UE according to the present invention. The UE transmits and receives data to and from a higher layer 2605, transmits and receives controls messages through a control message processing unit 2607, multiplexes, in a transmission mode, the data by means of a multiplexing device 2603 and transmits the multiplexed data by means of the transceiver 2601 under the control of a control unit 2609, receives, in a reception mode, a physical signal by means of receiver under the control of the control unit 2609, demultiplexes the received signal by means of a demultiplexing unit 2603, and delivers the demultiplexed signal to the higher layer 2605 or the control message processing unit.

In the present invention, if an A/D MAC CE is received, the control message processing unit 2607 notifies the SCell activation/deactivation processing unit 2611 to determine the first timing in the activated state and, when the first timing arrives, to command the control unit 2609 and the control message processing unit 2607 to perform the supposed operations. If it is commanded to deactivate an activated SCell, the SCell activation/deactivation processing unit 2611 determines a second timing and notifies the control unit 2609 and the control message processing unit 2607 of first operations to be performed before the arrival of the second timing and commands and of second operations to be performed at the second timing.

The proposed method is capable of performing predetermined operations at predetermined timings in association with SCell activation and deactivation in the case of using the carrier aggregation technique so as to make it possible to protect against malfunction and to perform accurate operations.

According to various embodiments of the present invention, the method and apparatus is capable of performing the measurement using radio access technologies (RATs) that differ from each other in a wireless communication system, and also capable of guaranteeing compatibility with versions of RATs which will be developed. The methods according to embodiments described in the claims or description can be implemented with hardware, software, and a combination thereof. When the methods are implemented with software, a computer-readable storage media where one or more programs (software modules) are stored is provided. One or more programs stored in the computer-readable storage media are configured for execution by one or more processors in the electronic devices. One or more programs include instructions for enabling the electronic device to execute the methods according to embodiments described in the claims or in the description. These programs (software modules and software) are stored in: Random Access Memory (RAM), flash memory, non-volatile memory, Read Only Memory (ROM), Electrically Erasable Programmable Read Only Memory (EEPROM), magnetic disc storage device, Compact Disc-ROM (CD-ROM), Digital Versatile Discs (DVDs) or other types of optical storage device, magnetic cassette, etc. or a combination thereof. In addition, two or more of the same type of memories form a memory block. In addition, the programs may also be stored in an attachable storage device accessible through a communication network, such as Internet, Intranet, Local Area Network (LAN), Wide Area Network (WAN), Storage Area Network (SAN) or a combination thereof. This storage device may be connected to the apparatus according to the present invention via external ports. In addition, a separate storage device of a communication network may be connected to the apparatus according to the present invention.

The terms as used in various embodiments of the present invention are merely for the purpose of describing particular embodiments and are not intended to limit the present disclosure. Singular forms are intended to include plural forms unless the context clearly indicates otherwise.

Although embodiments of the invention have been described in detail hereinabove, it should be understood that many variations and modifications of the basic inventive concept herein described, which may be apparent to those skilled in the art, will still fall within the spirit and scope of the embodiments of the invention as defined in the appended claims.

What is claimed is:

1. A method performed by a terminal in a wireless communication system, the method comprising:
   receiving, from a base station, a radio resource control (RRC) reconfiguration message configuring a medium access control (MAC) parameter for the terminal;
   identifying an uplink grant for a MAC protocol data unit (PDU);
   identifying that skip uplink transmission information indicating for the terminal to skip an uplink transmission is configured in the RRC reconfiguration message and that the uplink grant is addressed to a cell-radio network temporary identifier (C-RNTI) or is a configured uplink grant; and
   skipping a generation of the MAC PDU for the uplink grant, in case that a MAC service data unit (SDU) for the MAC PDU does not exist, and the MAC PDU includes only a padding buffer status report (BSR).

2. The method of claim 1, further comprising generating the MAC PDU for the uplink grant, in case that the skip uplink transmission information is not configured in the RRC reconfiguration message and the uplink grant is addressed to the C-RNTI.

3. The method of claim 1, wherein the skip uplink transmission information includes 1 bit to indicate for the terminal to skip the uplink transmission.

4. The method of claim 1, further comprising generating the MAC PDU for the uplink grant, in case that the MAC SDU for the MAC PDU exists.

5. A method performed by a base station in a wireless communication system, the method comprising:
   transmitting, to a terminal, a radio resource control (RRC) reconfiguration message configuring a medium access control (MAC) parameter for the terminal; and
   allocating an uplink grant for a MAC protocol data unit (PDU),
   wherein a generation of the MAC PDU is skipped for the uplink grant, in case that:
      skip uplink transmission information indicating for the terminal to skip an uplink transmission is configured in the RRC reconfiguration message and the uplink grant is addressed to a cell-radio network temporary identifier (C-RNTI) or is a configured uplink grant, and
      a MAC service data unit (SDU) for the MAC PDU does not exist, and the MAC PDU includes only a padding buffer status report (BSR).

6. The method of claim 5, wherein the MAC PDU is generated for the uplink grant, in case that the skip uplink transmission information is not configured in the RRC reconfiguration message and the uplink grant is addressed to the C-RNTI.

7. The method of claim 5, wherein the skip uplink transmission information includes 1 bit to indicate for the terminal to skip the uplink transmission.

8. The method of claim 5, wherein the MAC PDU is generated for the uplink grant, in case that the MAC SDU for the MAC PDU exists.

9. A terminal in a wireless communication system, the terminal comprising:
   a transceiver; and
   a controller configured to:
      receive, from a base station, a radio resource control (RRC) reconfiguration message configuring a medium access control (MAC) parameter for the terminal,
      identify an uplink grant for a MAC protocol data unit (PDU),
      identify that skip uplink transmission information indicating for the terminal to skip an uplink transmission is configured in the RRC reconfiguration message and that the uplink grant is addressed to a cell-radio network temporary identifier (C-RNTI) or is a configured uplink grant, and
      skip a generation of the MAC PDU for the uplink grant, in case that a MAC service data unit (SDU) for the MAC PDU does not exist, and the MAC PDU includes only a padding buffer status report (BSR).

10. The terminal of claim 9, wherein the controller is further configured to generate the MAC PDU for the uplink grant, in case that the skip uplink transmission information is not configured in the RRC reconfiguration message and the uplink grant is addressed to the C-RNTI.

11. The terminal of claim 9, wherein the skip uplink transmission information includes 1 bit to indicate for the terminal to skip the uplink transmission.

12. The terminal of claim 9, wherein the controller is further configured to generate the MAC PDU for the uplink grant, in case that the MAC SDU for the MAC PDU exists.

13. A base station in a wireless communication system, the base station comprising:
   a transceiver; and
   a controller configured to:
      transmit, to a terminal, a radio resource control (RRC) reconfiguration message configuring a medium access control (MAC) parameter for the terminal, and
      allocate an uplink grant for a MAC protocol data unit (PDU),
   wherein a generation of the MAC PDU is skipped for the uplink grant, in case that:
      skip uplink transmission information indicating for the terminal to skip an uplink transmission is configured in the RRC reconfiguration message and the uplink grant is addressed to a cell-radio network temporary identifier (C-RNTI) or is a configured uplink grant, and
      a MAC service data unit (SDU) for the MAC PDU does not exist, and the MAC PDU includes only a padding buffer status report (BSR).

14. The base station of claim 13, wherein the MAC PDU is generated for the uplink grant, in case that the skip uplink transmission information is not configured in the RRC reconfiguration message and the uplink grant is addressed to the C-RNTI.

15. The base station of claim 13, wherein the skip uplink transmission information includes 1 bit to indicate for the terminal to skip the uplink transmission.

16. The base station of claim 13, wherein the MAC PDU is generated for the uplink grant, in case that the MAC SDU for the MAC PDU exists.

* * * * *